United States Patent
Reynolds et al.

(10) Patent No.: US 7,047,831 B2
(45) Date of Patent: May 23, 2006

(54) DESIGN TEMPLATE

(75) Inventors: Herbert M. Reynolds, East Lansing, MI (US); Raymond R. Brodeur, Okemos, MI (US)

(73) Assignee: Michigan State University, East Lansing, MI (US)

( * ) Notice: Subject to any disclaimer, the term of this patent is extended or adjusted under 35 U.S.C. 154(b) by 782 days.

(21) Appl. No.: 10/035,990

(22) Filed: Dec. 31, 2001

(65) Prior Publication Data

US 2004/0011150 A1    Jan. 22, 2004

Related U.S. Application Data

(63) Continuation-in-part of application No. 08/949,213, filed on Oct. 10, 1997, now Pat. No. 6,840,125.

(60) Provisional application No. 60/259,003, filed on Dec. 29, 2000.

(51) Int. Cl.
    *G01M 19/00*     (2006.01)

(52) U.S. Cl. ...................................... 73/866.4

(58) Field of Classification Search ................ 73/172, 73/855.4, 866.4; 33/561.1, 561.3, 512; 297/181, 297/463.1; 280/801.1, 808
See application file for complete search history.

(56) References Cited

U.S. PATENT DOCUMENTS

| | | | |
|---|---|---|---|
| 3,147,617 A | 9/1964 | Kaptur, Jr. et al. | |
| 3,778,104 A | 12/1973 | Küsters | |
| 3,841,654 A | 10/1974 | Lewis | |
| 4,026,041 A | 5/1977 | Kennedy | |
| 4,242,802 A | 1/1981 | Jenner et al. | |
| 4,335,918 A | 6/1982 | Cunningham | |
| 4,578,875 A | 4/1986 | Vertin | |
| 4,669,302 A | 6/1987 | Wagner et al. | |
| 4,688,853 A | 8/1987 | Watts | |
| 4,728,150 A | 3/1988 | Gaudreau, Jr. | |
| 4,993,164 A | 2/1991 | Jacobsen | |
| 4,998,354 A | 3/1991 | Silverman et al. | |
| 5,018,790 A | 5/1991 | Jay | |
| 5,058,285 A | 10/1991 | Morita et al. | |
| 5,060,393 A | 10/1991 | Silverman et al. | |
| 5,193,285 A | 3/1993 | Heinrich et al. | |
| 5,235,988 A | 8/1993 | Johnson et al. | |
| 5,375,610 A | 12/1994 | LaCourse et al. | |
| 5,456,019 A | 10/1995 | Dowell et al. | |
| 5,483,825 A | 1/1996 | Greenbaum | |

FOREIGN PATENT DOCUMENTS

GB      986093      3/1965

OTHER PUBLICATIONS

Kinetic Computer Modeling of Human Posture in Automotive Seats, by David F. Ekern et al., Copyright 1997 Society of Automotive Engineers, Inc., pp. 125 through 133 (970592).

(Continued)

*Primary Examiner*—Robert Raevis
(74) *Attorney, Agent, or Firm*—Howard & Howard

(57) ABSTRACT

A design template includes a torso section being one of a group of a large male, medium male and small female having each being one of a group of an ERECT posture, a NEUTRAL posture and a SLUMPED posture. The design template also includes at least one cross-sectional section cooperating with the torso section at an anatomical landmark to provide a three-dimensional design template used for designing, evaluating, and measuring human occupant accommodation and seating in a seated environment.

65 Claims, 19 Drawing Sheets

OTHER PUBLICATIONS

Biomechanically Articulated Chair Concept and Prototypes, by Robert Hubbard and Christopher Gedraitis, Copyright 1997 Society of Automotive Engineers, Inc., pp. 117 through 124 (970591).

Development of Human Back Contours for Automobile Seat Design, by Barry L. Frost, III et al., Copyright 1997 Society of Automotive Engineers, Inc., pp. 107 through 115 (970590).

Measuring and Modeling of Human Soft Tissue and Seat Interaction, by Richard H. Setyabudhy et al., Copyright 1997 Society of Automotive Engineers, Inc., pp. 135 through 142 (970593).

Devices for Use in Defining and Measuring Vehicle Seating Accomodation—SAE J826 Apr. 1980.

Spatial Geometry of the Human Pelvis, by H.M. Reynolds, C.C. Snow, J.W. Young, Civil Aeromedical Institute, Mar. 1982.

Geometric Model and Spinal Motions of the Average Male in Seated Postures, by W. Haas, Thesis, Mar./Apr. 1990.

The Use of Electromyography for Seat Assessment and Comfort Evaluation, by T. Bush, F.T. Mills, K. Thakurta, R.P. Hubbard and J. Vorro, International Congress and Exposition, Feb. 1995 (950143).

Selected Design Parameters for Relining Seats Based on Engineering Anthropometry; M.M. Ayoub, S. Deivanayagam; Department of Industrial Engineering Texas Tech University, Lubbock, Texas; Sep. 1977.

An Investigation of Driver Discomfort and Related Seat Design Factors in Extended Duration Driving; Matthew P. Reed, Masatsugo Saito and Yasuo Kakishima, Nahm S. Lee & Lawrence W. Schneider ; International Congress and Exposition , Detroit, MI Feb. 25-Mar. 1, 1991.

Lumbar Support in Auto Seats: Conclusions from a Study of Preferred Driving Posture; Matthew P. Reed and Lawrence W. Schneider International Congress & Exposition, Detroit, MI Feb. 26-29, 1996.

A Kinematic Model of the Human Spine and Torso, Gary Monheit and Norman I. Badler; University of Penn, Mar. 1991.

Some Effects of Lumbar Support Contour on Driver Seated Posture; Matthew P. Reed, Lawrence W. Schneider and Bethany A. H. Eby; University of Michigan, no date.

Distribution of Automobile Trip Durations for Studies of Seat Comfort; Matthew P. Reed and Dawn L. Massie; University of Mich.; International Congress and Exposition, Detroit, MI Feb. 26-29, 1996.

Spinal Curvature of Young Adult Females; Herbert M. Reynolds, James J. Rechtien, Grayson W. Marshall and Sally Marshall, no date.

Anatomical Frames of Reference and Biomechanics; Herbert M. Reynolds and Robert P. Hubbard; Department of Biomechanics, Michigan State University Human Factors, 1980 22(2) 171-176.

The Influence of Backrest Inclination and Lumbar Support of Lumbar Lordosis; G.B.J. Anderson, MD, PhD; R.W. Murphy, MD, R. Ortengren, PHD; and A.L. Nachemson, MD, PhD.; Spine vol. 4, No. 1 Jan./Feb. 1979.

Lumbar Disc Pressure and Myoelectric Back Muscle Activity During Sitting; IV Studies on a Car Driver's Seat: R.J. G. Anderson, R. Ortengren, A Nachemson and G. Elfstrom; Scand J. Rehab Med 6:128-133, 1974.

A Design Layout and Method for Relating Seating to the Occupant and Vehicle; F.W. Babbs; T.I. Cox; Ergonomics, 1979, vol. 22 No. 2,227-234.

The Driving Seat. Its Adaptation to Functional and Anthropometric Requirement; Royal Aircraft Establishment, Mar. 1975.

Erect, Neutral and Slump Sitting Postures; A Study of the Torso Linkage System from Shoulder to Hip Joint, Herbert M. Reynolds; Oct. 1994.

Progress with Human Factors in Automotive Design: Seating Comfort, Visibility, and Safety, Published by Society of Automotive Engineers, Inc., Feb. 1997.

Stimulation of Torso Posture and Motion in Seating, by Robert Hubbard, Melissa Gedraitis, and Tamara Bush, presented at the Society of Automotive Engineers, Digital Human Modeling for Design and Engineering Conference and Exposition, Apr. 1998 (981304).

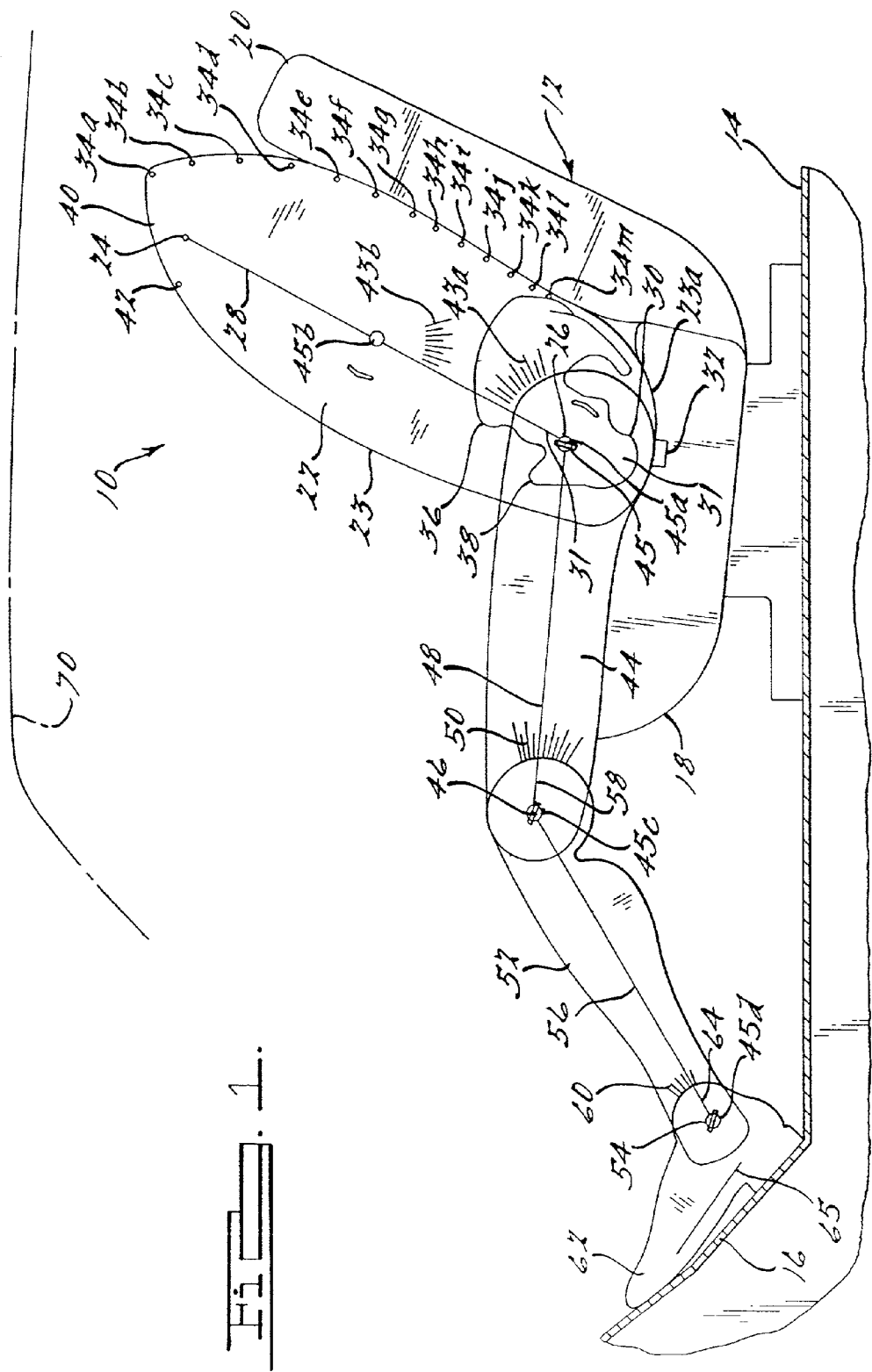

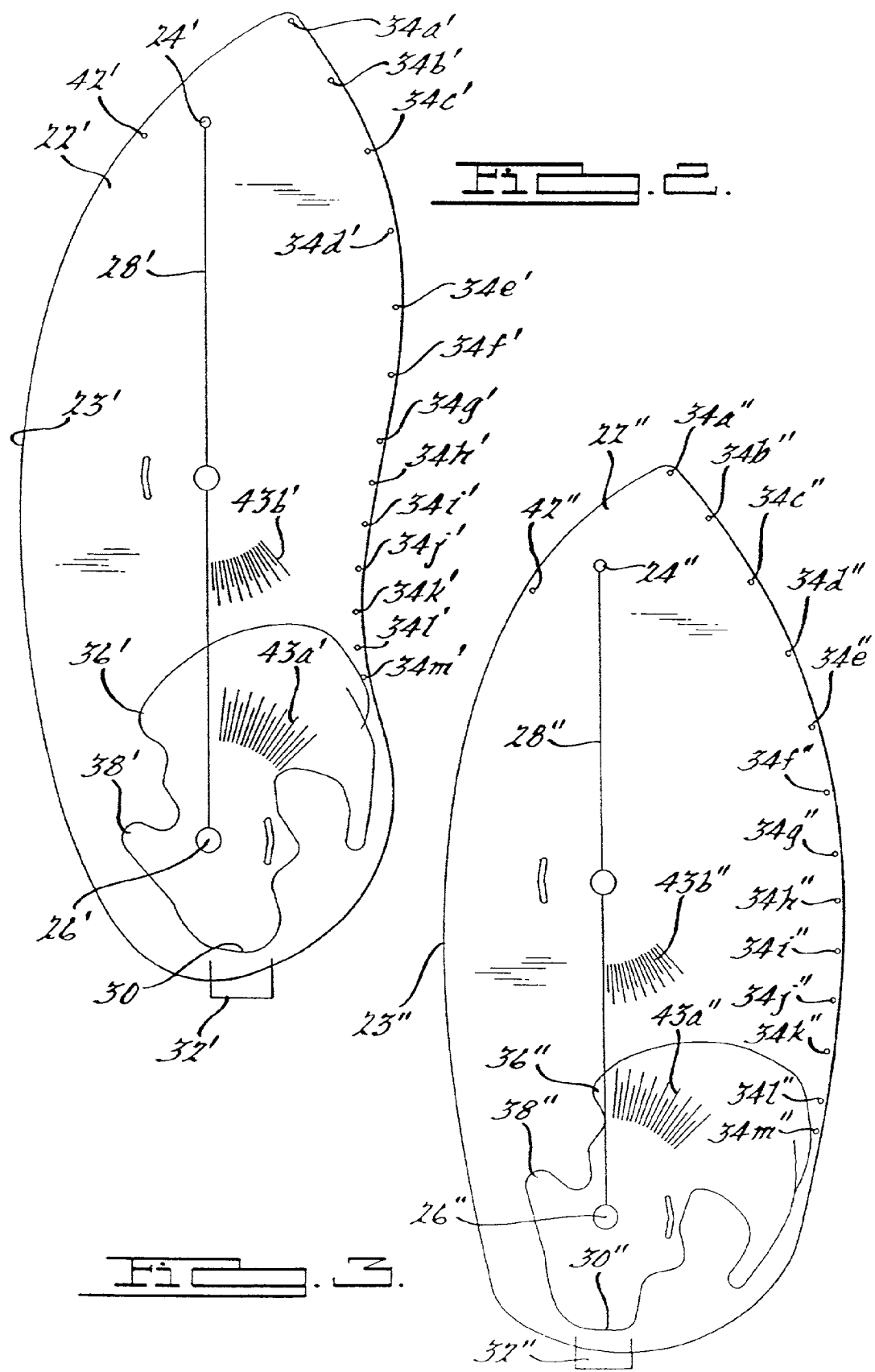

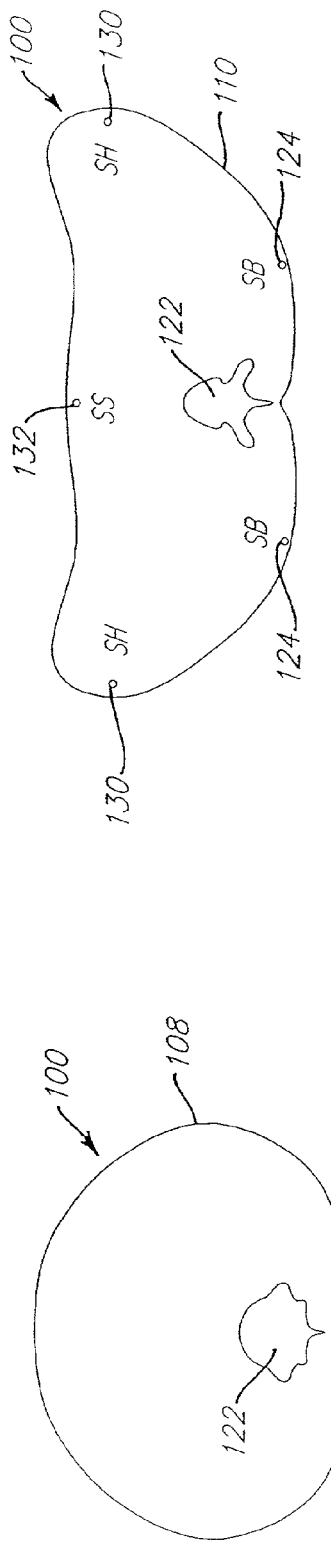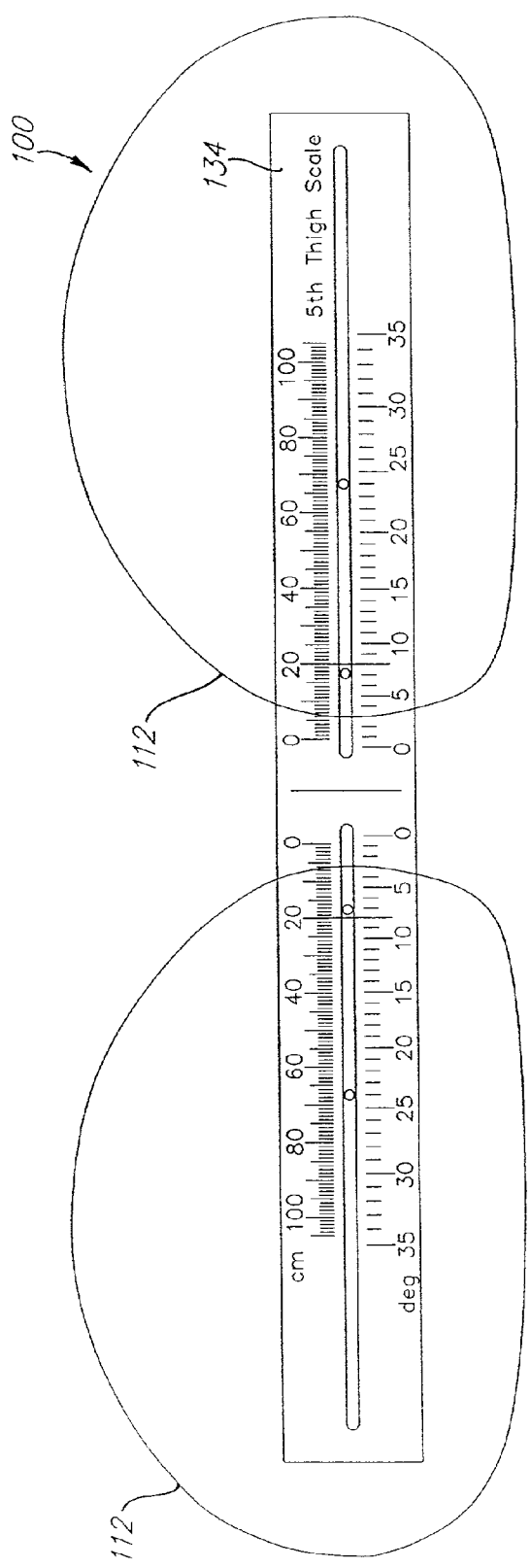
FIG. 17D.
FIG. 17E.
FIG. 17F.

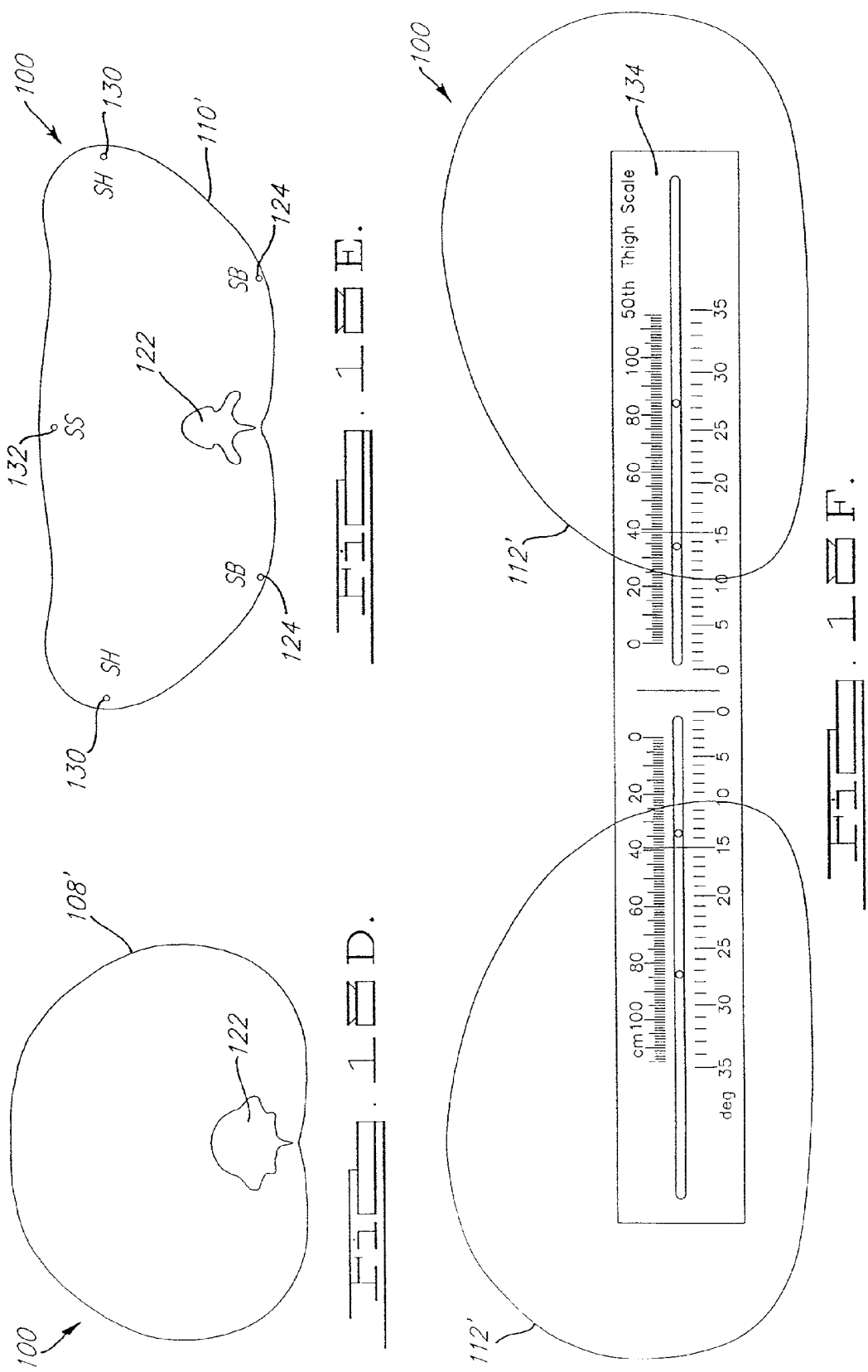

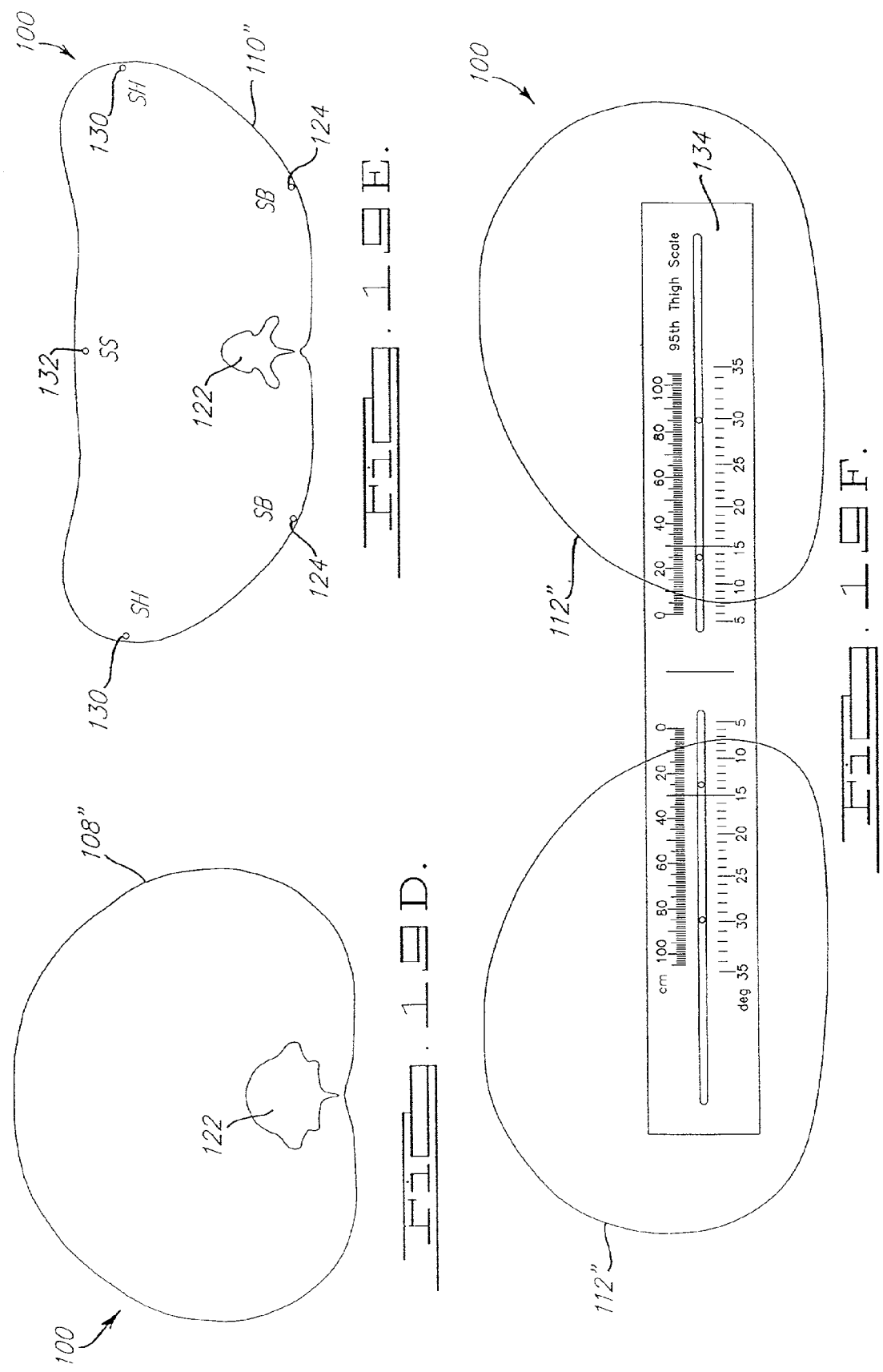

The Sagittal Plane Is The Projection Of Landmarks Onto The (X,Z) Plane.

DESIGN TEMPLATE

CROSS-REFERENCE TO RELATED APPLICATION(S)

This application is a Continuation-In-Part (CIP) of the application having U.S. Ser. No. 08/949,213, filed Oct. 10, 1997 now U.S. Pat. No. 6,840,125, entitled DESIGN TEMPLATE. This application claims priority to and all benefits of the copending provisional application having U.S. Ser. No. 60/259,003, filed Dec. 29, 2000, entitled DESIGN TEMPLATE.

BACKGROUND OF THE INVENTION

1. Field of the Invention

The present invention relates generally to three-dimensional templates and, more particularly, to a three-dimensional design template used for designing, evaluating, and measuring human occupant accommodation and seating in a seated environment.

2. Description of the Related Art for Automotive Vehicle Seats

Automotive vehicle seats have three primary functions: (1) position an occupant for a driving task; (2) support comfortable healthy sitting postures; and (3) protect the occupant upon vehicle impact. A deformable pad on a mechanically adjustable seat frame accomplishes the first function and the second function is accomplished through the geometrical and mechanical properties of the deformable pad composed of one or more padding, suspension, and upholstery. The third function is accomplished by seat and restraint systems to restrain the occupant during a vehicle impact. The first two functions determine the greatest portion of the occupant's perceived level of comfort. Position has been considered a primary determinant of occupant comfort and posture has been relegated to the occupant's ability to adapt to the vehicle environment. A major function of seat position and its supporting surfaces is, however, to support the occupant's posture. Thus, there is a need in the art to provide a design tool for automotive vehicle seats.

It is known in the automotive manufacturing industry that seat design relies on a tool built in the early 1960's to represent the position of the hip joint (SAE H-point) and leg links for locating the position of the vehicle occupant in the occupant compartment of an automotive vehicle. This tool is known as "Oscar". Oscar is not constructed for seat design but has become an industry standard because there is no suitable tool that identifies the location of the occupant's torso in the seat. As stated in Volume IV, 1984, SAE Handbook as follows:

"The devices described in this standard are intended for applications concerning seated driver side or center occupant accommodation spaces only and are not to be construed as instruments which measure or indicate occupant capabilities or comfort." (p. 24–27).

The tool known as "Oscar" is disclosed in U.S. Pat. No. 3,147,617 to Kaptur, Jr. et al., which describes an accommodation checking device. The accommodation checking device is positioned on a seat in order to determine whether the seat and the body are suitable for accommodation of a known predetermined human body. The accommodation checking device includes a seat pan having a lower outer surface thereof shaped to conform to a lower surface of upper leg portions or buttocks of the predetermined human body. The accommodation checking device also includes a back pan having a rear outer surface thereof shaped to conform to a contour of an outer surface of a back of the predetermined human body. A pivot provides a pivotal connection between the seat pan and the back pan. A member is marked off in angular degrees on each side thereof and other members include pointers to register with the numerals on the member. However, these angular degrees are for joint angles and do not indicate skeletal landmarks relative to a seated human body occupant.

Contour shape of an unoccupied seat is an important aspect of seat comfort, but an interface between the seat and occupant is defined by a deformed shape of both the seat and the occupant. The deformed contour of the human body is difficult to measure. In order to understand the shape between the occupant and the seat, a tool is needed that allows for accurate measurement of the deformed contour of the occupant, with minimal effect on the interface between the seat and occupant.

It is known that body loads are transferred to the seat through the skeleton of the human body. Therefore, the location of bony landmarks on deformed contours is needed to improve seat design.

Contour shape has been measured directly by attaching displacement meters through the seat to the contact surface, but this method damages the structure and therefore changes the mechanics of the seat. Plaster casts have also been used to obtain the deflected tissue shape with the assumption that the shape is plaster does not change the shape of the body and is unchanged during the shift in load as the subject moves from the seat. However, the plaster cast technique cannot be used to study the interaction between the body and the existing seat nor is it suitable to measure the effect of a deformable seat on the shape of the occupant. Therefore, there is a need in the art to provide a design template of the human body having cross-sectional shapes for biomechanical design that are based upon measurements of the deformed shape of the occupant due to the reactive loads of a deformable pad as those used in the automotive vehicle.

SUMMARY OF THE INVENTION

It is, therefore, one object of the present invention to provide a three-dimensional design template.

It is another object of the present invention to provide a design template that accurately represents the cross-sectional shape of an occupant.

It is yet another object of the present invention to provide a design template that incorporates cross-sectional sections as part of the geometric representation of the occupant.

It is still another object of the present invention to provide a design template that is anatomically and biomechanically correct to represent typical occupants.

It is a further object of the present invention to provide a design template that correctly describes the deformed shape of an interface between occupant and seat and describes the location of anatomical details relative to these contours.

It is yet a further object of the present invention to provide a method for designing a seat with design templates.

It is a still further object of the present invention to provide a method of using design templates to design a vehicle seat for manufacture.

It is another object of the present invention to provide a method of using design templates to define an offset surface from occupant to seat structures that might contact the body when occupying the seat.

To achieve the foregoing objects, the present invention is a design template. The design template includes a torso section being one of a group of a large male, medium male and small female having each being one of a group of an ERECT posture, a NEUTRAL posture and a SLUMPED posture. The design template further includes at least one cross-sectional section cooperating with the torso section at an anatomical landmark to provide a three-dimensional design template used for designing, evaluating, and measuring human occupant accommodation and seating in a seated environment.

Also, the present invention is a method for designing a seat including selecting at least one design template having a torso section being one of a group comprising a large male, medium male and small female having each being one of a group comprising an ERECT posture, a NEUTRAL posture and a SLUMPED posture and at least one cross-sectional section cooperating with the torso section at an anatomical landmark to provide a three-dimensional design template. The method also includes forming load supporting patches on the seat for the at least one design template and forming unloaded patches on the unoccupied seat for the at least one design template.

Further, the present invention is a method of using a design template to design a vehicle seat including providing at least one design template having a torso section being one of a group comprising a large male, medium male and small female having each being one of a group comprising an ERECT posture, a NEUTRAL posture and a SLUMPED posture and at least one cross-sectional section cooperating with the torso section at an anatomical landmark to provide a three-dimensional design template. The method includes establishing occupant accommodation criteria based on positioning the at least one design template in a predetermined class of vehicles to define seat position to accommodate each design template on a seat having a seat cushion and a seat back in a vehicle representing the vehicle package criteria. The method also includes defining at least one from a group comprising unloaded patches on the seat at $A^u$, $S^U$, $L^U$, $B^u$, $I_D{}^U$ and $T^U$. The method further includes defining at least one from a group comprising a seat back height, seat cushion length, head restraint position, shoulder patch, thorax patch, lumbar patch, bite line patch, ischial patch, thigh patch, seat cushion bolster (e.g., wings region) and seat suspension for the seat relative to the design template.

Additionally, the present invention is a seat including a seat cushion, a seat back associated with the seat cushion, and at least one from a group comprising a seat back height, seat cushion length, head restraint position, shoulder patch, thorax patch, lumbar patch, bite line patch, ischial patch, thigh patch and seat suspension being defined for the seat cushion and the seat back relative to a design template. The design template has a torso section being one of a group comprising a large male, medium male and small female having each being one of a group comprising an ERECT posture, a NEUTRAL posture and a SLUMPED posture and at least one cross-sectional section cooperating with the torso section at an anatomical landmark to provide a three-dimensional design template.

Also, the present invention is an occupant restraint system for a seat including a lap belt being anchored to vehicle structure to extend below an anterior superior iliac spine and above an anterior inferior iliac spine for a design template with a torso section being one of a group comprising an ERECT posture, a NEUTRAL posture and a SLUMPED posture. The occupant restraint system also includes a shoulder belt being anchored to vehicle structure to extend between a first predetermined distance from a centerline of the seat to a shoulder joint for a design template. The design template has a torso section being one of a group comprising a small female, a large male and a medium male and a second predetermined distance from the centerline of the seat to a neck/shoulder junction for the design template. The design template has at least one cross-sectional section cooperating with the torso section at an anatomical landmark to provide a three-dimensional design template.

Further, the present invention is a method of establishing occupant accommodation criteria in a vehicle package based on a predetermined class of vehicles. The method includes providing a design template having a torso section being one of a group comprising a large male, medium male and small female having each being one of a group comprising an ERECT posture, a NEUTRAL posture and a SLUMPED posture and having a leg section and at least one cross-sectional section cooperating with the torso section at an anatomical landmark to provide a three-dimensional design template. The method also includes defining a planar region under the accelerator to provide a heel point of the leg section and defining stiffness of the seat whether it is high stiffness (hard) or low stiffness (soft) or some stiffness therebetween. The method includes positioning the design template in the vehicle such that the heel of the leg section is in the heel point region under the accelerator and the angles of the leg section, i.e., ankle, knee and thigh, are within their predetermined comfort ranges and establishing a seat height from the floor to the bottom of the torso section at $I_D$.

One advantage of the present invention is that a design template incorporating cross-sectional sections is provided to design, evaluate, and measure vehicle occupant accommodation. Another advantage of the present invention is that a design template having cross-sectional sections is provided for a three-dimensional geometric representation of the occupant. Yet another advantage of the present invention is that the design template incorporates cross-sectional sections to correctly represent the anatomy, biomechanics, and anthropometry of typical human occupants and is simple to use. Still another advantage of the present invention is that the design template has cross-sectional sections that accurately define the contact contours between the occupant and seat. A further advantage of the present invention is that a seat can be designed with a design template having three-dimensional shape to provide support and comfort to a human body occupant. Yet a further advantage of the present invention is that the design template has cross-sectional sections to provide contour shape that can be used to establish occupant accommodation criteria in a vehicle package based on a predetermined class of vehicles. Still a further advantage of the present invention is that the design template has cross-sectional sections that can be used for measuring the deflected contour between an occupant and a seat. Another advantage of the present invention is that the design template has cross sectional sections that can be used to generate three-dimensional clearance surfaces to define the space required between occupant and any non-deformable structures in the seat that the body might strike when subjected to external loads while sitting in the seat.

Other objects, features, and advantages of the present invention will be readily appreciated, as the same becomes better understood, after reading the subsequent description when considered in connection with the accompanying drawings.

BRIEF DESCRIPTION OF THE DRAWINGS

FIG. 2 is an elevational view of an ERECT posture torso section of the design template of FIG. 1.

FIG. 3 is an elevational view of a SLUMPED posture torso section of the design template of FIG. 1.

FIG. 17D is an "L" cross-sectional section for a small female of the design template of FIG. 1.

FIG. 17E is an "A" cross-sectional section for a small female of the design template of FIG. 1.

FIG. 17F is a right and left thigh center of gravity (CG) cross-sectional section for a small female of the design template of FIG. 1.

FIG. 18A is a "B" cross-sectional section for a medium male of the design template of FIG. 1.

FIG. 18B is an "S" cross-sectional section for a medium male of the design template of FIG. 1.

FIG. 18C is an "$I_D$" (i.e. pelvis) cross-sectional section for a medium male of the design template of FIG. 1.

FIG. 18D is an "L" cross-sectional section for a medium male of the design template of FIG. 1.

FIG. 18E is an "A" cross-sectional section for a medium male of the design template of FIG. 1.

FIG. 18F is a right and left thigh center of gravity (CG) cross-sectional section for a medium male of the design template of FIG. 1.

FIG. 19D is an "L" cross-sectional section for a large male of the design template of FIG. 1.

FIG. 19E is a "B" cross-sectional section for a large male of the design template of FIG. 1.

FIG. 19F is a right and left thigh center of gravity (CG) cross-sectional section for a large male of the design template of FIG. 1.

DESCRIPTION OF THE PREFERRED EMBODIMENT(S)

Figure 1A:
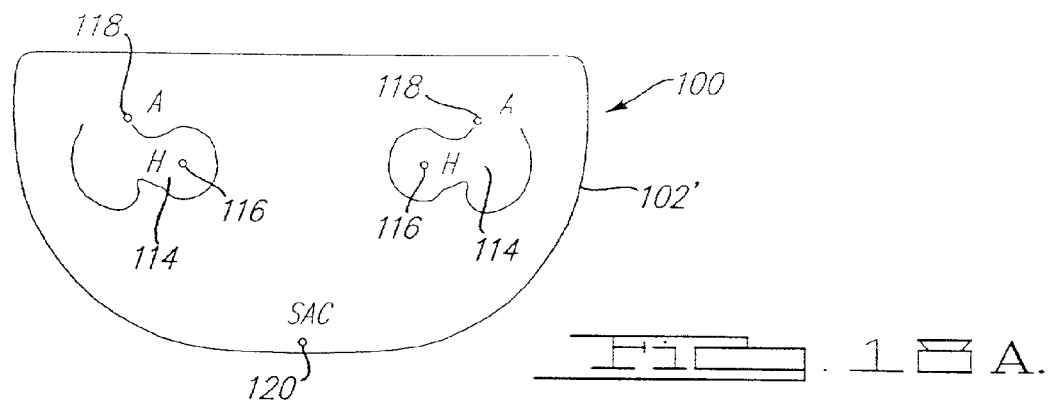
FIG. 1 is an elevational view of a design template, according to the present invention, illustrated in operational relationship with a seat and having a NEUTRAL posture torso section.
Figure 1B:
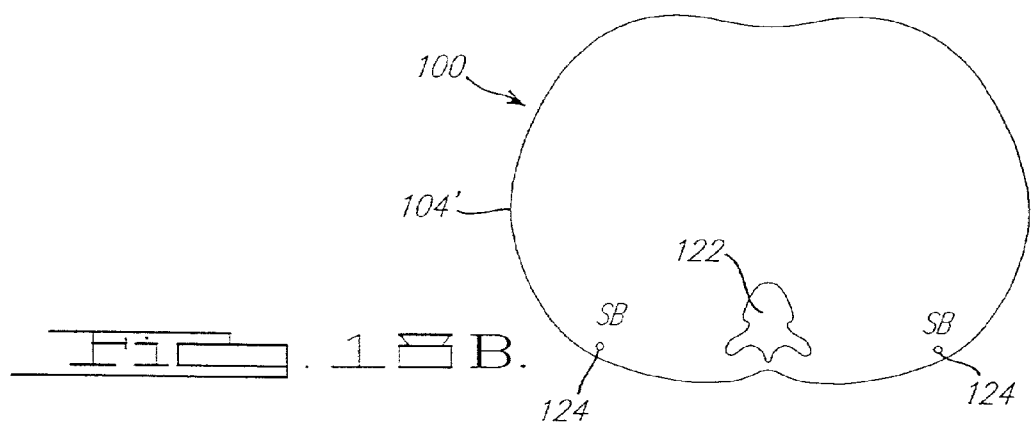
Figure 1C:
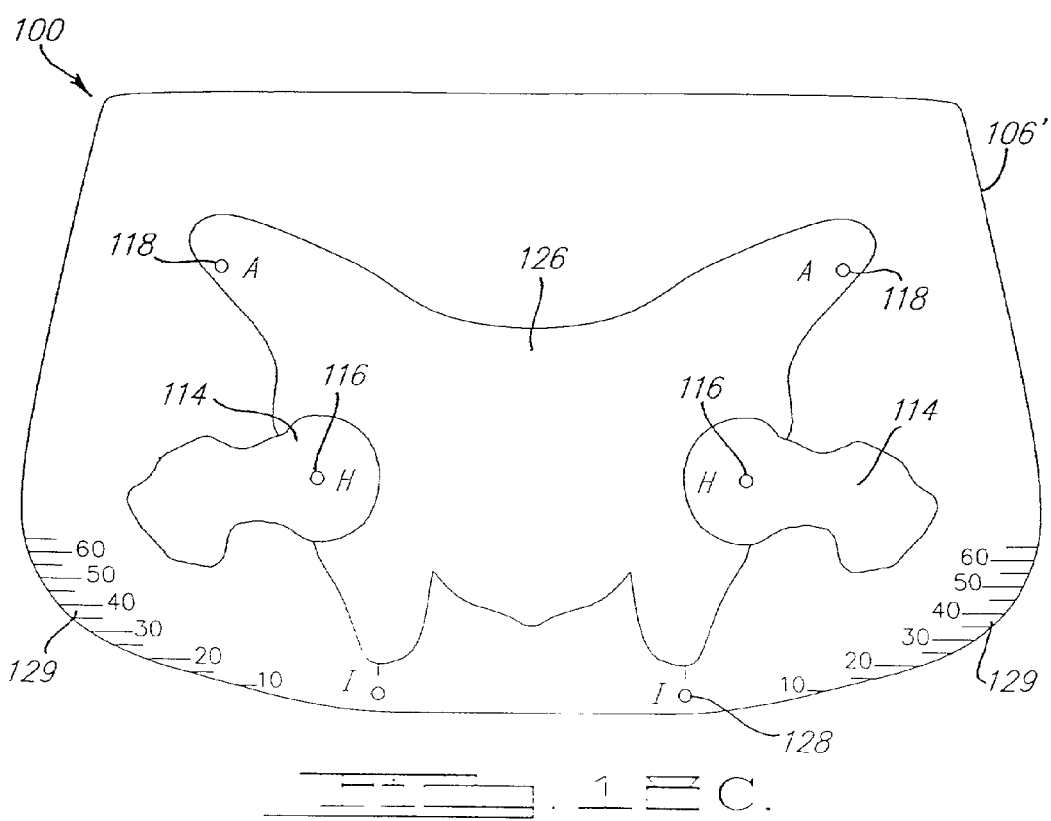

Referring to FIG. 1, one embodiment of a design template 10, according to the present invention, is illustrated in operational relationship with a seat, generally indicated at 12, of an automotive vehicle (not shown). The automotive vehicle includes a floor pan 14, which includes a toe pan or toe board 16 adjacent to a front end thereof. The seat 12 is mounted on the floor pan 14 by suitable adjustable mounting mechanisms (not shown). The seat 12 includes a seat cushion 18 to primarily support a torso weight under an ischium of a human body occupant and a weight of a thigh of the human body occupant and a seat back 20 to support a back of the human body occupant primarily in a thoracic and lumbar regions of the human body occupant. It should be appreciated that the design of the seat cushion 18 and seat back 20 will be in accordance with the design template 10 to resiliently and comfortably support the human body occupant when seated thereon in any of the torso postures being one of a group of ERECT posture, NEUTRAL posture, or SLUMPED posture.

The design template 10, according to the present invention, is used to design the seat 12. The design template 10 includes at least one, preferably a plurality of torso sections 22. The torso sections 22 are dimensionally accurate to simulate or represent body size of a human male who is large in weight and stature, a human male who is medium in weight and stature or a human female who is small in weight and stature. It should be appreciated that the small female is representative of the smallest body size while the large male is representative of the largest body size. It should be appreciated that, in the embodiment described, a small female is defined as $5^{th}$ percentile, a medium male is defined as $50^{th}$ percentile, and a large male is defined as $95^{th}$ percentile.

In general, the development of the design template 10 has relied upon the U.S. Public Health Service for height and weight description of the general population and the U.S. military for the anthropometric dimensions of the human body that are used in ergonomic design. Anthropometric surveys, however, measure people in standardized sitting and standing postures. Since the purpose of the design template 10 is to represent the human body in anatomically and biomechanically correct sitting postures, additional data had to be collected that would describe the human torso in a range of sitting postures. Sitting posture is primarily a function of torso posture. As a result, an investigation was conducted of torso back shape in different sitting postures.

The results can be divided into two parts: 1) the size and shape of the torso sections 22 and 2) the size and shape of the leg sections (thigh sections 44, calf sections 52 and shoe sections 62 to be described). The human body was divided into three sizes: small female, average or medium male, and large male. The torso was divided into three shapes representing three postures: ERECT, NEUTRAL, and SLUMPED. The human body sizes were defined by anthropometric dimensions and regression equations that describe the relationships between the dimensions. The torso shapes were mathematically defined from measurements of subjects in five positions.

In general, spinal, chest, pelvic, and extremity landmarks in fifty females and fifty-two males were measured in five postures, ranging from full lumbar extension to fully slouched. Spine height was used to normalize the back curvatures for each subject so that variation in the shape of the back due to size differences was minimized. The data that measures lumbar curvature for each posture was represented by a second order polynomial that was fit to the lumbar spine data and the average lumbar curvatures for each subject in the region bounded by L1 and L5 was calculated. Subjects were used to define the three postures if they had back curvatures within mathematically prescribed limits that define ERECT (lumbar extension with a relative curvature greater than 0.6 radians per spine height), NEUTRAL (straight lumbar spine with a relative curvature between +0.6 and −0.6 radians per spine height), and SLUMPED (lumbar flexion with a relative curvature less than −0.6 radians per spine height).

In order to obtain an average spinal shape, data from subjects measured were statistically weighted according to their sitting height so that the statistical distribution of measured subjects matched those from the military anthropometric survey. The spinal shapes of the statistically weighted data were then averaged. The average male ERECT postures were then scaled to match the military medium and large cervical sitting height. The average female ERECT posture was scaled to match the military small cervical sitting height. The same scaling factors were applied to the NEUTRAL and SLUMPED spinal shapes.

The pelvis in both males and females is based upon the average pelvis from an FAA pelvic study by Reynolds in 1982. The large male pelvis is scaled up from the average male pelvis and the small female pelvis is scaled down from the average female pelvis. The position of the pelvis was measured in each posture described above. The three-dimensional coordinates that describe the average pelvis in the FAA skeletal database are rotated to the same pelvic orientation as the pelvis position in the measured subjects. After orienting the pelvis, the size of the pelvis was scaled to equal the pelvis size of the subjects in the NEUTRAL posture as represented by the distance between the Ischial Tuberosity and S1. The resulting skeletal data are optimally matched for position and size in the measured laboratory subjects. The spine was attached at S1 after correcting for tissue thickness in the pelvis and back.

The leg sections were defined for each of the three human body sizes: large male, average male, and small female. The definition came from anthropometric estimates of the distance between joint centers at the hip, knee, and ankle, otherwise referred to as link lengths. The depth of the sections was estimated from anthropometric equations that defined the relationship between human body weight and human body depth. These dimensions were used to assemble the thigh and calf sections to look like human segments for each of the three human body sizes.

The foot is assumed to be covered by an average shoe size for each of the respective human body sizes. The small female shoe is a size six, the average and large male shoe sizes are ten and twelve, respectively. The location of the ankle joint relative to the shoe was estimated from measurements of live people. It should be appreciated that the above was used to generate the design template 10.

As illustrated in FIG. 1, the torso section 22 is for a medium male with a NEUTRAL posture. FIG. 2 illustrates a torso section 22 for a medium male with an ERECT posture. FIG. 3 illustrates a torso section 22 for a medium male with a SLUMPED posture. It should be appreciated that the torso section 22 can be for either the large male or small female with either one of a NEUTRAL, ERECT or SLUMPED posture.

The torso section 22 has an outer contour 23. The outer contour 23 has an interface portion 23a conforming to a deformed shape between the seat 12 and a seated human body occupant. The outer contour 23 also has an anterior portion 23b that is anthropometrically and anatomically correct. The torso section 22 is made of any suitable media to represent the torso of a human body occupant. For example, the media may be electronic (e.g., CAD model), paper, wood, plastic, or the like.

Figure 4:
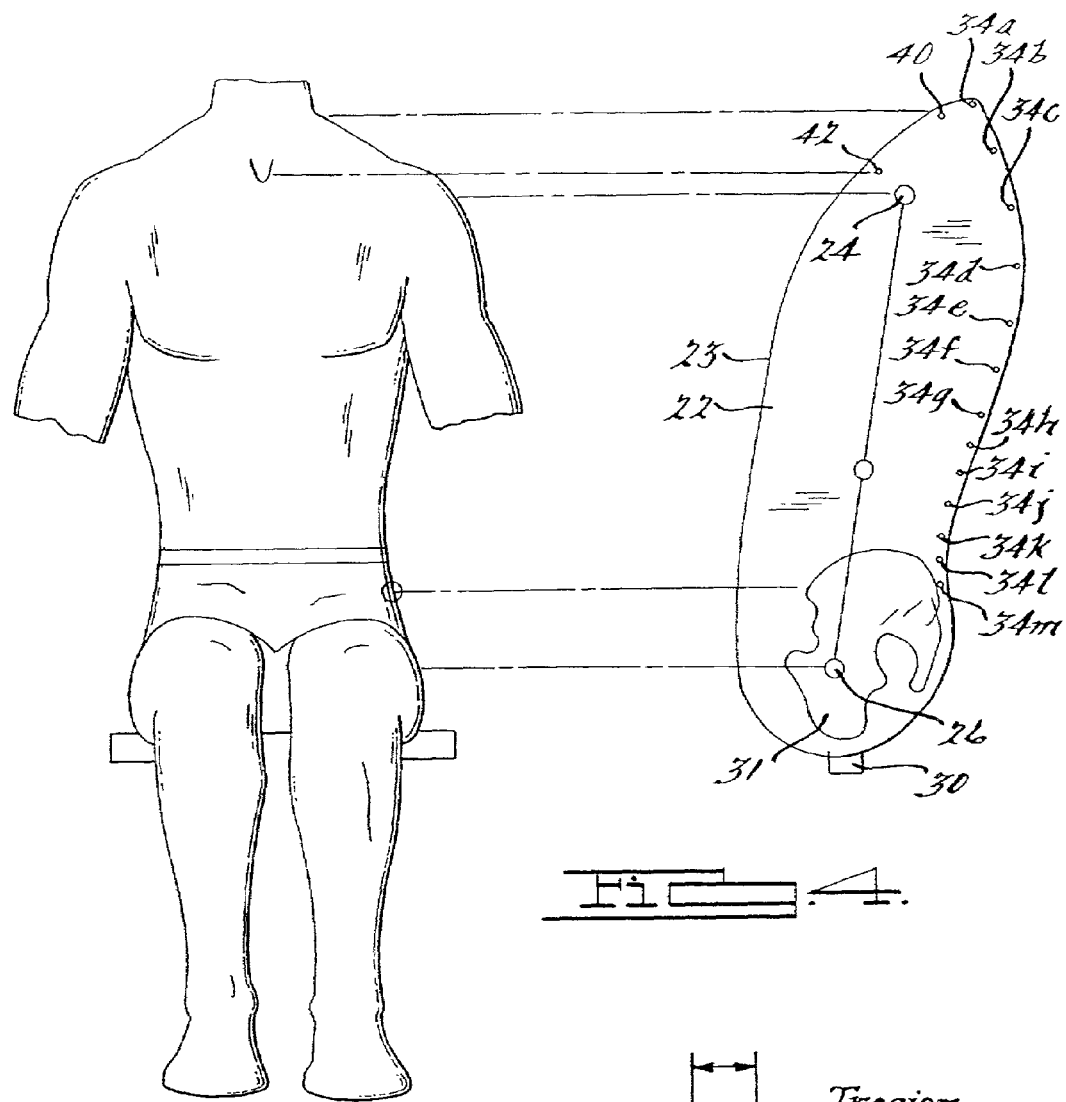
FIG. 4 is an elevational view of the design template of FIG. 1 relative to a front of a human body occupant.
Figure 5:
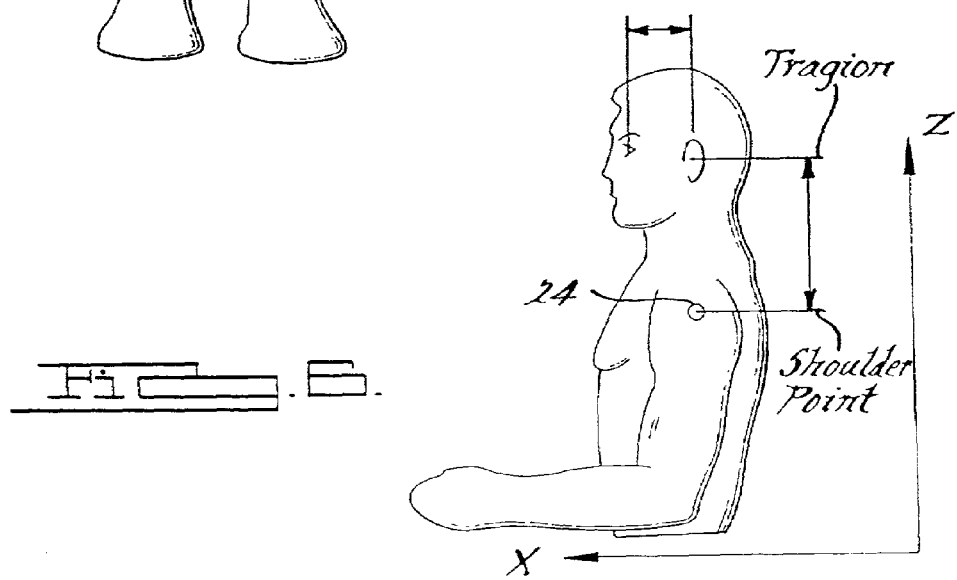
FIG. 5 is an elevational view of the design template of FIG. 1 relative to a side of a human body occupant.
Figure 6:
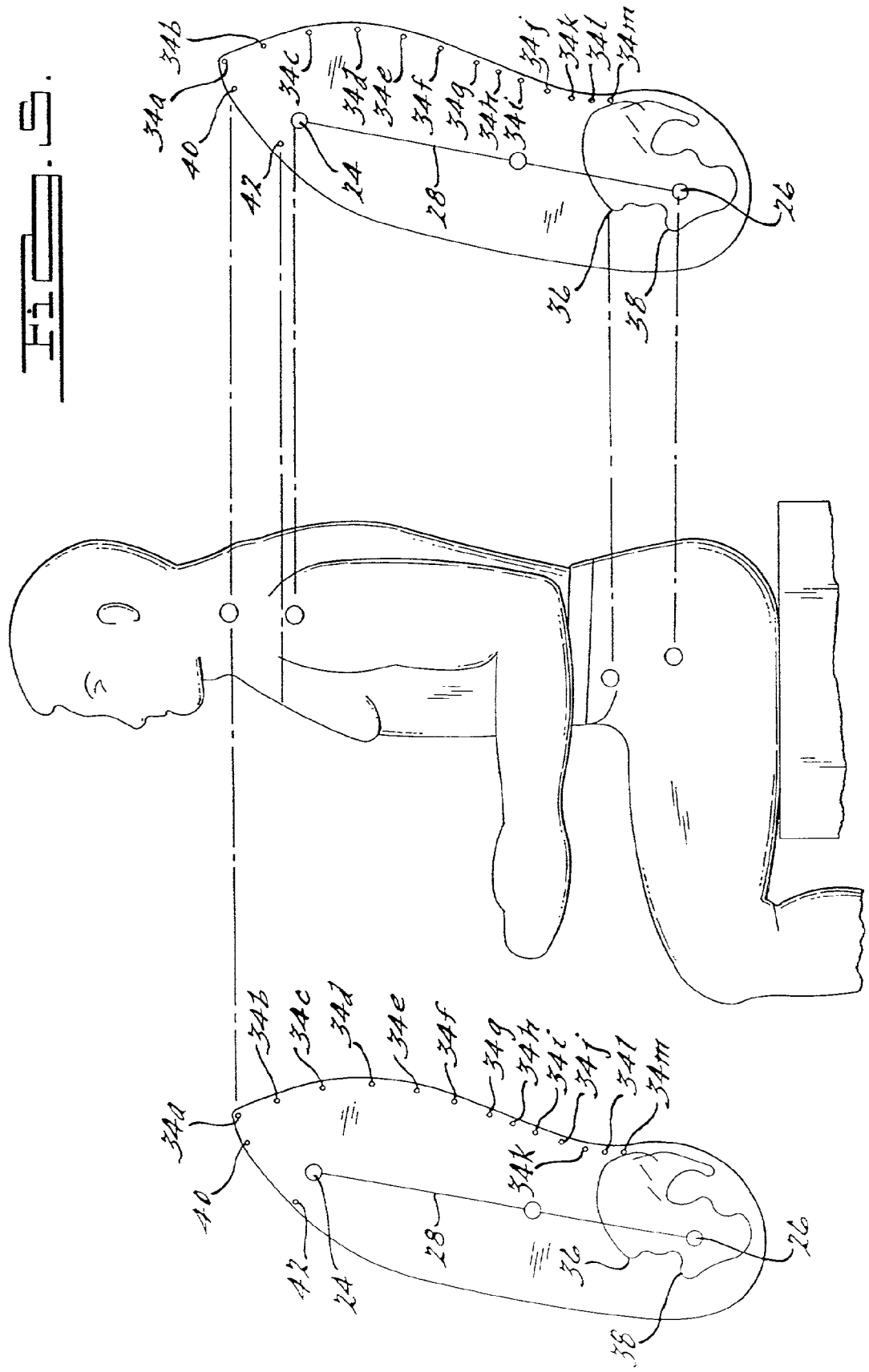
FIG. 6 is an elevational view of a human body occupant illustrating eye location relative to a shoulder point.
Figure 7:
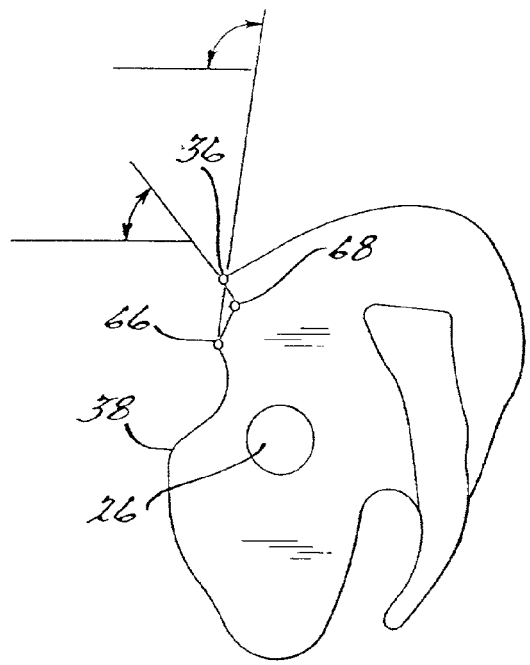
FIG. 7 is an elevational view of a pelvis illustrating angle of pelvic landmarks with respect to lap belt contact points.
Figure 8:
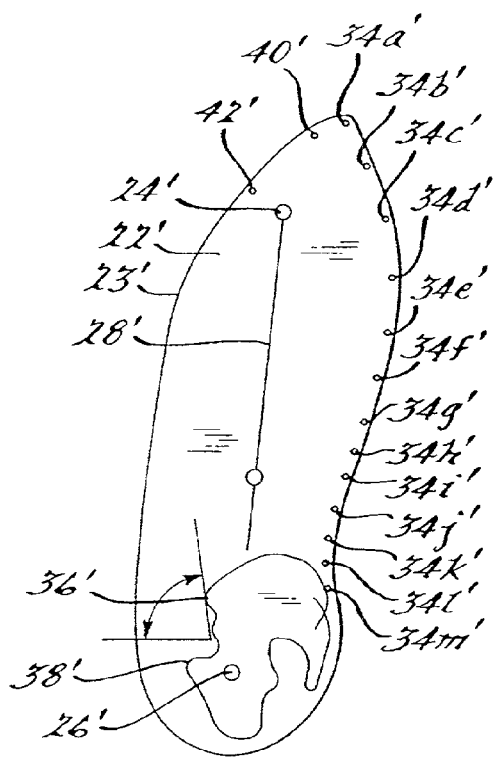
FIG. 8 is an elevational view of the design template of FIG. 1 with an ERECT posture illustrating angle of pelvic landmarks with respect to lap belt contact points.
Figure 9:
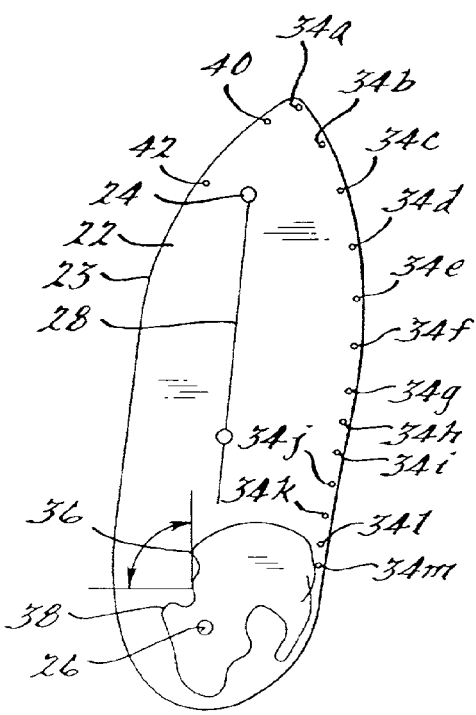
FIG. 9 is a view similar to FIG. 8 illustrating a NEUTRAL posture.
Figure 10:
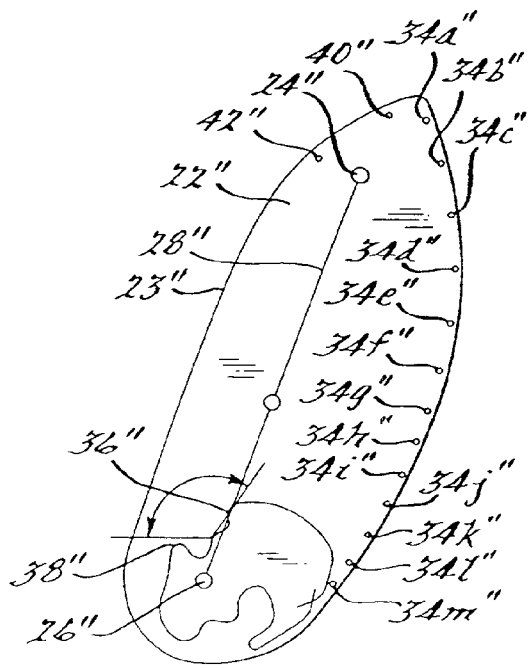
FIG. 10 is a view similar to FIG. 8 illustrating a SLUMPED posture.
Figure 11:
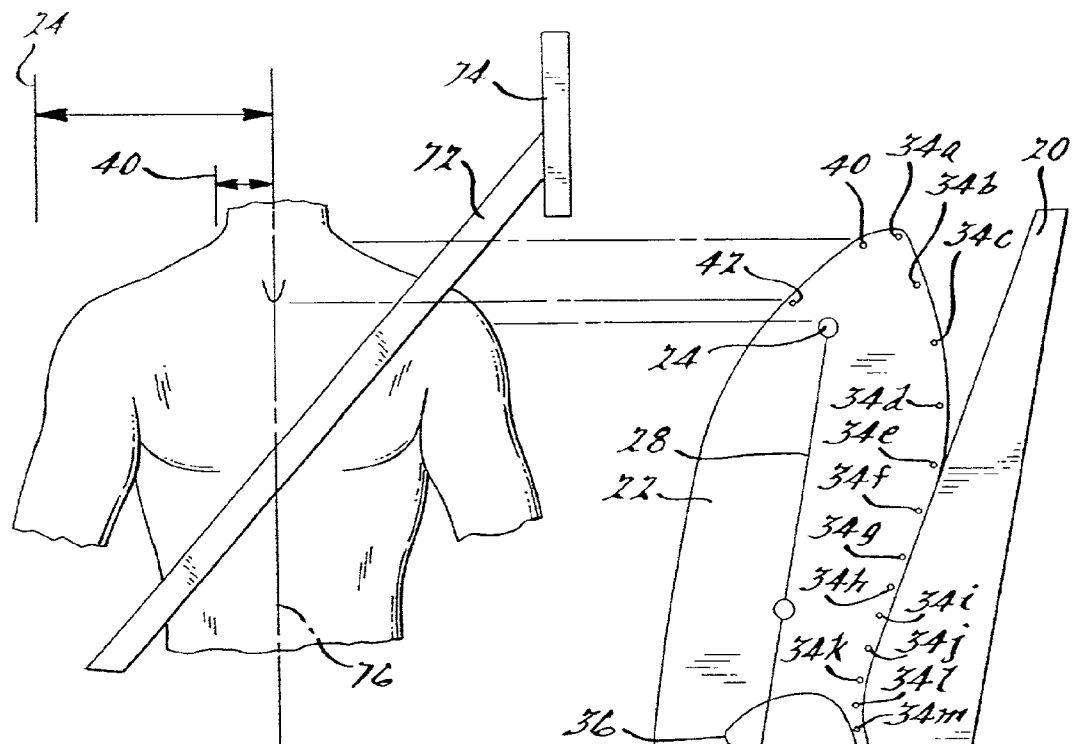
FIG. 11 is an elevational view of the design template of FIG. 1 illustrating shoulder belt positions relative to design template landmarks.

Referring to FIGS. 4 through 5, the torso section 22 includes anatomical details located relative to each other and the interface contour 23a is located relative to the anatomical details. The torso section 22 contains indicia of skeletal landmarks relative to a seated human body occupant. For example, the torso section 22 includes skeletal landmarks of a shoulder joint 24 and a hip joint 26 and a line axis 28 connected therebetween. The torso section 22 includes skeletal landmarks of a centerline projection of a pelvis with indicia representing an ischial tuberosity, anterior superior iliac spine, pelvic symphysis, and sacrum. The torso section 22 also has skeletal landmarks of a point $I_D^{\,0}$ 30 (FIG. 12) as the lowest point on an ischial tuberosity 31 projected to the interface contour 23a of the occupied seat. Since the majority of torso weight passes through $I_D^{\,0}$ 30, the area of the seat 12 below this point will have the highest pressure as well as the most deflection. The torso section 22 also has skeletal landmarks such as spinal landmarks 34 marked along the entire length of the back thereof. The spinal landmarks 34 are important for correctly placing a lumbar patch to be described and lumbar support and for adequate design of a shoulder patch, chest patch, and biteline patch to be described. The spinal landmarks 34 are for the neck (cervical spine) indicating C7 at 34a, chest (thoracic spine) indicating T2, T4, T6, T8, T10, T12 at 34b, 34c, 34d, 34e, 34f and 34g, respectively, referred to as point S (FIG. 12), low back (lumbar spine) indicating L1 through L5 at 34h, 34i, 34j, 34k and 34*l*, respectively, referred to as point L (FIG. 12), and sacrum (attaches the spine to the pelvis) indicating S1 at 34*m*. The T4 joint spinal landmark 34*c* is important for correctly placing a shoulder patch 160*e* to be described, bottom of head restraint, and top of seat back 20. It should be appreciated that the hip joint 26 is referred to as the H-point in SAE seat design practice. The hip joint 26 is a ball-and-socket joint connecting the thigh to the pelvis of a human body occupant. It should also be appreciated that the anterior shape of the torso section 22 is anthropometrically and anatomically correct. It should further be appreciated that the location of "$I_D^0$" 30 changes with posture.

The torso section 22 has indicia for the most anterior portion on the top of a pelvis of a human body occupant, which is the anterior superior iliac spine (ASIS), point A 36 and a pubic symphysis, point P 38. A lap belt to be described should cross below point A 36 and above point P 38. The torso section 22 also has indicia for the shoulder joint 24, neck/shoulder junction, point N 40 and a suprasternal (top of sternum), point SS 42. The shoulder strap should be below point N 40 and above shoulder joint 24.

The torso section 22 includes a first angular scale 43*a* for hip angle and a second angular scale 43*b* for torso angle. A torso bar is connected to the torso section 22 on the hip joint 26 to shoulder joint axis 28, 205 mm from the hip joint 26 for all torso sections 22. The torso bar is connected to the torso section 22 by a hinge such as a hollow bolt and nut 45*b*. It should be appreciated that the angle on the second angular scale 43*b* indicates the angle between line axis 28 and vertical as defined by parallel indicia lines on the torso bar. Furthermore, it should be appreciated that the first angular scale 43*a* has a range of 45° to 180° with a comfort range of 85° to 125°. It should be appreciated that the second angular scale 43*b* has a range of −20° to 45° with a comfort range of 10° to 30°.

The design template 10 also includes at least one thigh section 44. The thigh sections 44 are dimensionally accurate to simulate or represent human body size of the large male, medium male, and small female. The thigh section 44 is made of any suitable media to represent the thigh of a human body occupant. For example, the media may be electronic, paper, wood, plastic, or the like.

The thigh section 44 is connected to the torso section 22 at the hip joint 26 by a hinge such as a hollow bolt and nut 45*a*. The thigh section 44 includes indicia of the hip joint 26 and a knee joint 46 and a line axis 48 therebetween. The thigh section 44 also includes an angular scale 50 for knee angle and a pointer 51 for hip angle. It should be appreciated that the angular scale 50 for the knee angle has a range of 45° to 180° with a comfort range of 110° to 140°. It should also be appreciated that the pointer 51 indicates the angle on the first angular scale 43*a* for the angle between the line axis 48 and line axis 28.

The thigh section 44 has a deformed bottom contour 51*a* representing a change from hard bone tissue to soft muscle tissue in contact with the seat cushion 18. The thigh section 44 and torso section 22 are geometrically congruent in a seated posture where they overlap on the seat cushion 18.

The design template 10 also includes at least one calf section 52. The calf sections 52 are dimensionally accurate to simulate or represent human body size of the large male, medium male, and small female. The calf section 52 is made of any suitable media to represent the calf of a human body occupant. For example, the media may be electronic, paper, wood, plastic, or the like.

The calf section 52 is connected to the thigh section 44 at the knee joint 46 by a hinge such as a hollow bolt and nut 45*c*. The calf section 52 includes indicia of the knee joint 46 and an ankle joint 54 and a line axis 56 therebetween. The calf section 52 also includes indicia of a pointer 58 for knee angle and an angular scale 60 for ankle angle. The calf section 52 and thigh section 44 are geometrically congruent in a seated posture where they overlap on anterior and superior contours. It should be appreciated that the angular scale 60 for the ankle angle has a range of 70° to 160° with a comfort range of 85° to 115°. It should also be appreciated that the pointer 58 indicates the angle on the angular scale 50 for the angle of the knee between the line axis 48 and line axis 56.

The design template 10 further includes at least one shoe section 62. The shoe sections 62 are dimensionally accurate to simulate or represent human shoe size of the large male, medium male, and small female. The shoe section 62 is made of any suitable media to represent the shoe. For example, the media may be electronic, paper, wood, plastic, or the like.

The shoe section 62 is connected to the calf section 52 at the ankle joint 54 by a hinge such as a hollow bolt and nut 45*d*. The shoe section 62 includes indicia for the ankle joint 54, a pointer 64 for the ankle angle and a line axis 65 from a ball of foot to heel of foot inside a shoe. It should be appreciated that the shoe section 62 has a heel. It should also be appreciated that the pointer 64 indicates the angle on the angular scale 60 for the angle of the ankle between the line axis 65 and line axis 56.

Referring to FIGS. 7 through 11, the torso section 22 contains indicia on the location of landmarks that define the optimal path of a lap belt and a shoulder belt of an occupant restraint system. It should be appreciated that this information is important for lap belt and shoulder belt attachment points relative to differences in the position of the seat 12 and human body occupant size and human body occupant posture.

The torso section 22 also has the indicia of the anterior superior iliac spine (ASIS) 66. The torso section 22 further has the indicia of an ASIS notch 68. It should be appreciated that the lap belt should lie below the ASIS 36 of the human body occupant to reduce chances for "submarining" (occupant sliding under the lap belt) in the event of a vehicle collision.

Accordingly, an occupant restraint system, according to the present invention, includes a lap belt anchored to vehicle structure such that it extends below the ASIS 36 and above the AIIS 66 for the design template 10 with the torso section 22 being one of a group of ERECT posture, NEUTRAL posture or SLUMPED posture. The occupant restraint system includes a shoulder belt 72 anchored to vehicle structure 74 such that it extends a first predetermined distance from a centerline 76 of the seat 12 to the shoulder joint 24 for the design template 10 with the torso section 22 being either the small female, large male, or medium male and a second predetermined distance from the centerline of the seat 12 to the neck/shoulder junction 40 for the design template 10 with the torso section 22 being either the small female, medium male or the large male. The first predetermined distance and second predetermined distance are found in the following table:

TABLE 1

Location of shoulder belt for design templates.

| Design Template 10 | First Predetermined Distance from Centerline to Shoulder[1] (mm) | Second Predetermined Distance from Centerline to base of neck[2] (mm) |
|---|---|---|
| Small Female | 190 | 51 |
| Medium Male | 246 | 65 |
| Large Male | 267 | 71 |

[1]Half bideltoid distance.
[2]Radius of the circumference at the base of neck.

Use of Templates in Vehicle Packaging

Figure 12:
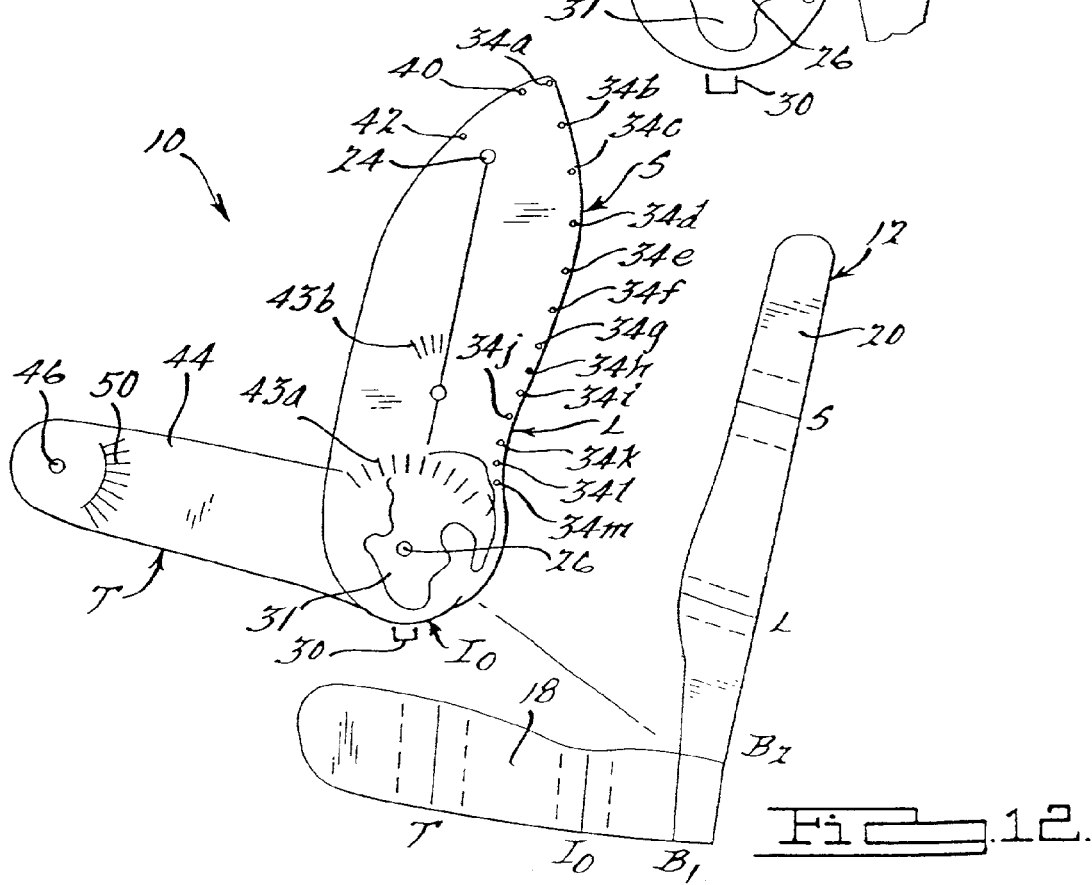
FIG. 12 is an elevational view of the design template of FIG. 1 and a cross-section of a seat.
Figure 13:
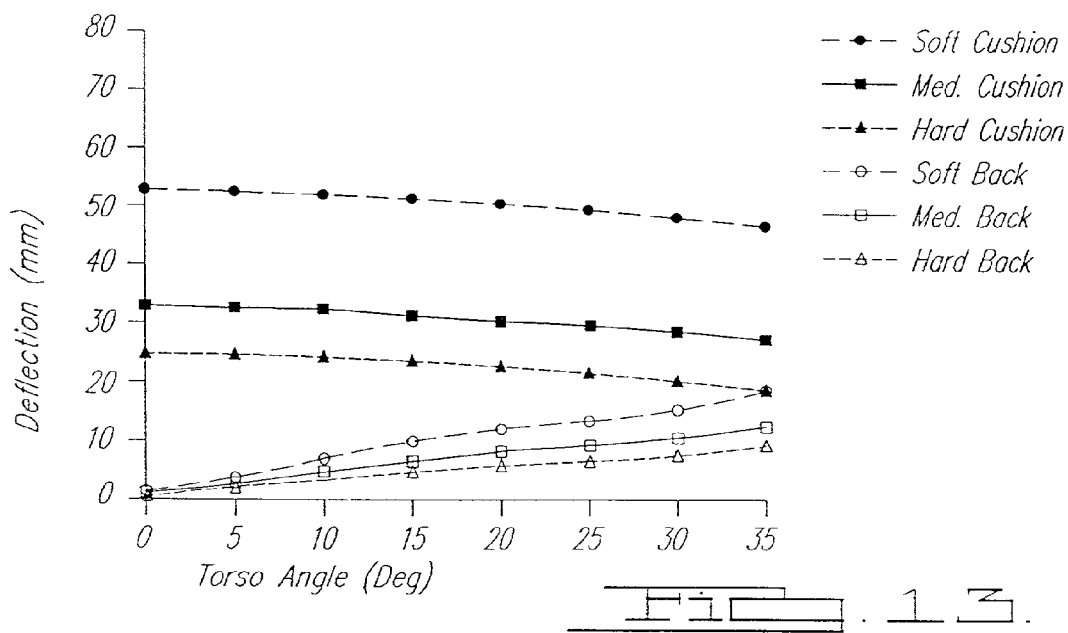
FIG. 13 is a graph that is representative of seat cushion and seat back deformation for small female having a NEUTRAL posture.
Figure 14:
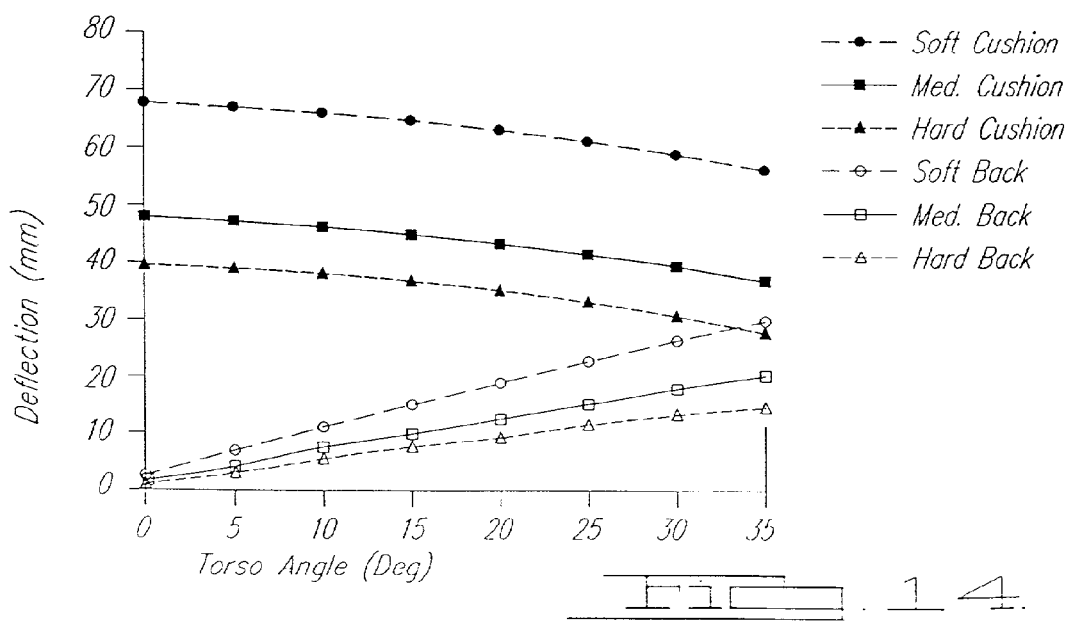
FIG. 14 is a graph that is representative of seat cushion and seat back deformation for medium male having a NEUTRAL posture.
Figure 15:
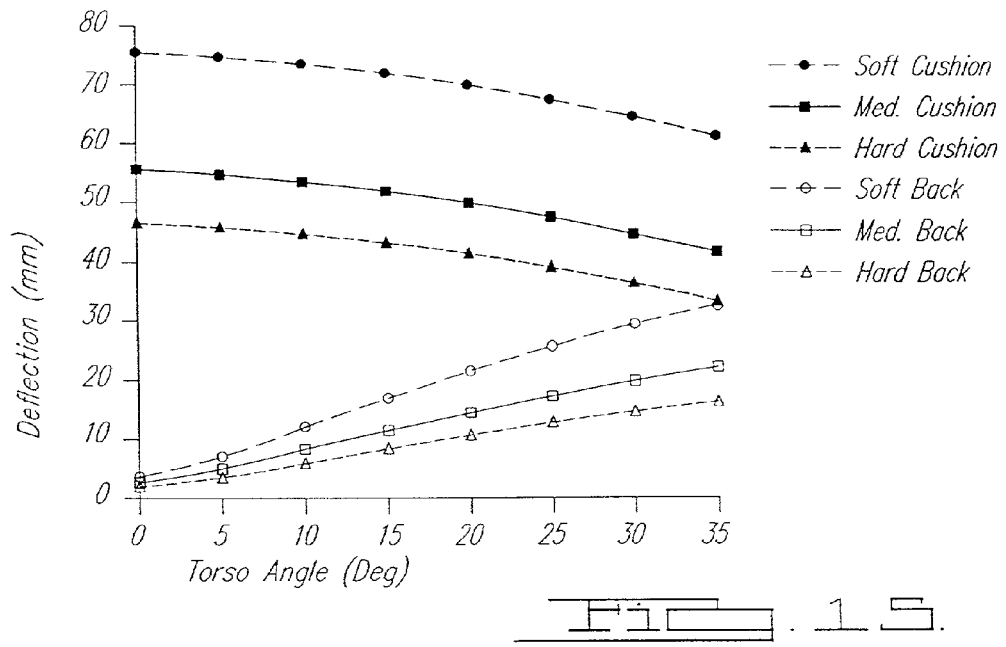
FIG. 15 is a graph that is representative of seat cushion and seat back deformation for a large male having a NEUTRAL posture.
Figure 16:
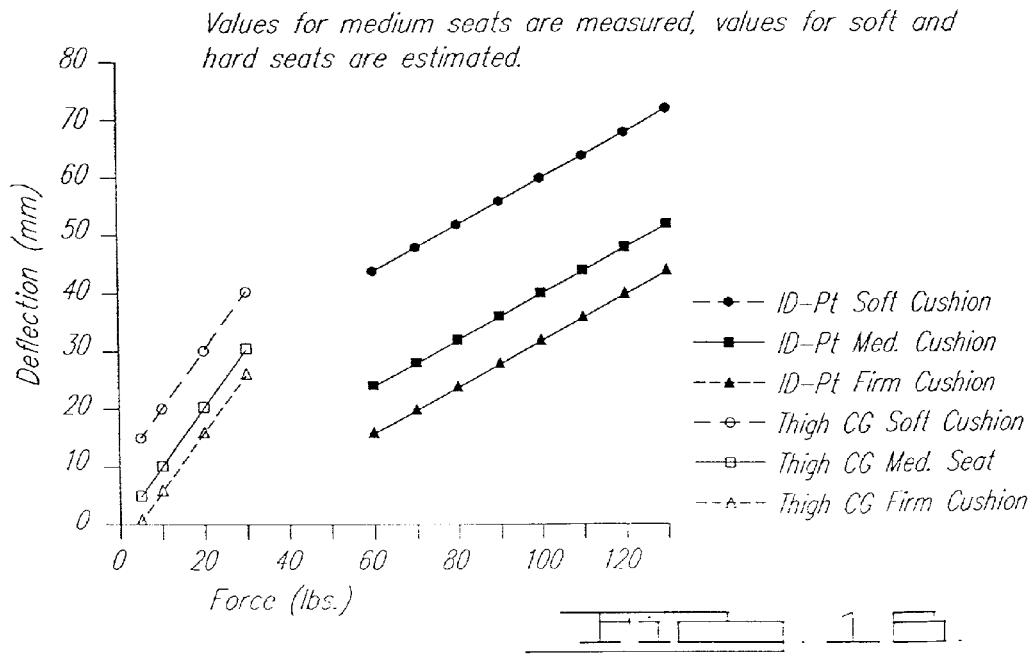
FIG. 16 is an estimated force deflection curve for typical soft, medium, and hard seats.

A method, according to the present invention, is disclosed of establishing occupant accommodation criteria in a vehicle package based on a predetermined class of vehicles. The method includes providing the design template 10 having the torso section 22 being at least one of the large male, medium male, or small female with the torso section 22 being one of the group of the ERECT posture, NEUTRAL posture, or SLUMPED posture and a corresponding percentile leg section made up of the thigh section 44, calf section 52 and shoe section 62. Within a human body size, the leg sections are the same for all three postures, only the curvature of the spinal column in the centerline differs. The method includes defining a planar heel region such as the toepan 16 under an accelerator (not shown) to provide a heel point of the shoe section 62. The method includes defining a vision line of sight, for example by eye position, required to operate the vehicle. The method further includes defining stiffness of the seat 12 whether it is high stiffness (hard), low stiffness (soft), or a stiffness therebetween. The method also includes the use of a biomechanical model to calculate loads from body weight acting on the seat at the T, L, $I_D$ and S body regions (FIG. 12). The method also includes positioning the design template 10 in the vehicle such that the heel of the shoe section 62 is in the heel region under the accelerator with the ball of foot on the accelerator, the bottom of the thigh section 44 under "$I_D$" 30 and "T" cross-sectional section 112 to be described is supported by the seat cushion 18, the torso section 22 is supported by the seat back 20 at S 34e and L 34k, and angles of the leg section are within predetermined comfort ranges. The method also includes establishing the deflection of the seat 12 by calculating the forces acting on the seat 12 that counteract body weight on the seat 12 per seat stiffness criteria.

Location of Hip Joint and Seat Travel

The hip joint represents the two-dimensional center of rotation of the hip joint 26 and is located at the center of the hollow nut and bolt 45a. The hip joint window in a vehicle package is defined by a polygon that contains the locations of the small female, medium male, and large male hip joints 26 for the range of comfort angles (Table 2) in the ankle, knee and hip joints per vehicle package requirements. The package requirements define an occupant space between the vehicle floorpan 14 and a vehicle headliner 70 that determines in large part the space available for the seat 12 and the human body occupant. As the space available for the seat 12 and human body occupant diminish, the mechanical properties of the seat 12 and its geometrical shape and size become more critical in supporting the variety of postures (Table 3) represented by the design template 10 for the seat design process.

1. The method includes the step of adjusting joint angles at an ankle, knee, and hip of the design template 10 to lie within a predetermined range. For example, adjust linkage joint angles between ankle, knee, and hip of the design template 10 to lie within predetermined comfort ranges at each joint. Joint angles are laid out on the design template 10 at the hip, knee, and ankle joints. The design template angles for comfort are defined for the torso, thigh and each of the leg joints within the following ranges (Table 2).

TABLE 2

Comfort Joint Angles

| Dimension | Definition | Design Template 10 |
|---|---|---|
| Torso | Vertical = 0° | 6° to 26° |
| Thigh | 90° (Hip-Torso) | 1° to 20° |
| Hip | Included Angle | 85° to 125° |
| Knee | Included Angle | 105° to 145° |
| Ankle | Included Angle | 85° to 93° |

2. The method includes the step of reclining the torso section 22 a predetermined angle from vertical. The torso angle for the seat back 20 is defined with vertical at zero. For example, recline the torso section 22 from vertical according to the design template 10 posture as follows (Table 3):

TABLE 3

Torso back angles for the design templates per posture group.

| Posture | Recommended Angles | Total Angle |
|---|---|---|
| ERECT | 8°–12° | 6°–18° |
| NEUTRAL | 14°–16° | 8°–22° |
| SLUMPED | 12°–16° | 12°–26° |

Horizontal Seat Travel

The x position in the environment (i.e., fore-aft direction) is defined by the location of the hip joints 26 in the vehicle x direction from the small female to the large male. Ankle angle, accelerator pedal orientation, and length of the leg are the most important parameters in this packaging dimension. Comfort angles (Table 2) at the knee vary according to seat height packaging. As the seat height (i.e., SAE H61) space rises, the comfort angle of the knee used to define x position of the seat 12 decreases. As the seat height space decreases, the comfort angle of the knee used to define x position of the seat 12 increases. If comfort angle of the ankle remains in the 85° to 90° range and the thigh angle with horizontal remains in the 5° to 10° range, the horizontal seat adjustment range is large.

Vertical Seat Travel

The z position in the environment (i.e., vertical direction) is defined by the location of the hip joints 26 in the vehicle z direction from the large male to the small female. Posture varies according to packaging volume and occupant preference, but in general, the method includes locating an eye position (e.g., relative to shoulder joint) such that seat travel accommodates vision requirements for all human body occupants in all postures. As the seat height (i.e., SAE H61) space decreases, a SLUMPED posture becomes more possible in the human body occupant. As the seat height space increases, an ERECT posture becomes more likely in the human body occupant. The vision needs of different size human body occupants and the amount of headroom in the vehicle package largely determine seat travel in this direction.

TABLE 4

Location of Eye relative to shoulder joint in design template 10.

| Design Template 10 | Horizontal (X) mm (Forward) | Vertical (Z) mm (Above) |
|---|---|---|
| Small Female | 52 | 186 |
| Medium Male | 63 | 205 |
| Large Male | 69 | 212 |

Heel Location and Computation of Hip Joint for Comfort Angles in the Leg

The location of the heel is determined by ankle angle and accelerator-foot axis orientation. The prescribed ankle angle lies between 85° and 93° with the shoe section 62 positioned so that the foot axis 65 is parallel to and in contact with the undepressed accelerator (0 mph) pedal.

1. A method for establishing occupant accommodation in a vehicle package, according to the present invention, is disclosed. In general, the method includes the steps of selecting at least one design template 10 having a torso section 22 being one of a large male, medium male, and small female having either an ERECT posture, a NEUTRAL posture, or SLUMPED posture and having a leg section. The leg section is made up of the thigh section 44, calf section 52, and shoe section 62. The method also includes the step of marking the location of heel point and hip joint 26.

2. The method includes the step of positioning the heel of the shoe section 62 on the floorpan 14 with the foot axis 65 of the shoe section 62 parallel to and in contact with the undepressed (0 mph) accelerator pedal axis. The method also includes the step of positioning the shoe section 62 parallel to the floorpan 14 if designing for a passenger seat or some other seating application. For the driver, forcing the foot axis 65 to remain parallel to and in contact with the accelerator pedal may place the knee and hip joints outside their range of seating comfort. However, adjusting the foot axis 65 so that the angle varies up to 10° or more from the accelerator pedal axis provides for a wider range of positions while maintaining joint angles within their comfort range. This adjustment is best because it represents the compensational change in ankle angle brought about by leg splay and calf rotation in the actual vehicle package.

3. The method includes the step of locating the center of the hip joint 26 to define the hip joint for the large male ($Hpt^{95}$). Since the design template 10 represents the human body occupant in a seat, the vertical and horizontal location of $Hpt^{95}$ is defined in an occupied seat of a vehicle package based on a predetermined class of vehicles for the design template 10 of the large male. The horizontal location of $Hpt^{95}$ in the vehicle package is defined by the position of the heel on the floorpan 14 and the comfort angles (Table 2) of the ankle, knee, and thigh that control the relative orientations of the shoe section 62, calf section 52, and thigh section 44 of the design template 10 of the large male. The vertical location of $Hpt^{95}$ is defined by the height from the floorpan 14 to center of the circle defined by the hollow bolt and nut 45a of the design template 10 of the large male. Since the forces on the occupied seat under hip joint 26 at $I_D^O$ 30 are determined by torso size and torso angle, the vertical space in the centerline of the seat 12 available for supporting seat structures is defined by the vertical height of the interface portion 23a of the outer contour of the design template 10 from the floorpan 14. Torso angle is selected to accommodate eye vision and head clearance of the large male in the vehicle package based on the height available in a predetermined class of vehicles from the floorpan 14 to the headliner 70. After optimally positioning the design template 10 of the large male, measure the two-dimensional coordinates of "$I_D$" 30 of the design template 10 of the large male having one of the ERECT posture, NEUTRAL posture, or SLUMPED posture.

4. The method includes the step of positioning the heel of the shoe section 62 for the design template 10 of the small female having one of the ERECT posture, NEUTRAL posture or SLUMPED posture in the vehicle package. Since the design template 10 represents the human body occupant in a seat, the vertical and horizontal location of the hip joint 26 for the small female ($Hpt^5$) is defined in an occupied seat of a vehicle package based on a predetermined class of vehicles for the design template 10 of the small female. The horizontal location of $Hpt^5$ in the vehicle package is defined by the position of the heel on the floorpan 14 and the comfort angles (Table 2) of the ankle, knee, and thigh that control the relative orientations of the shoe section 62, calf section 52 and thigh section 44 of the design template 10 of the small female. The vertical location of $Hpt^5$ is defined by the height from the floorpan 14 to center of the circle defined by the hollow bolt and nut 45a of the design template 10 of the small female. Since the forces on the occupied seat under hip joint 26 at $I_D^O$ 30 are determined by torso size and torso angle, the vertical space in the centerline of the seat 12 available for supporting seat structures is defined by the vertical height of the interface portion 23a of the outer contour of the design template 10 from the floorpan 14. Torso angle is selected to accommodate eye vision and head clearance of the small female in the vehicle package based on the height available in a predetermined class of vehicles from the floorpan 14 to the headliner 70. After optimally positioning the design template 10 of the small female, measure the two-dimensional coordinates of "$I_D$" 30 of the design template 10 of the small female having one of the ERECT posture, NEUTRAL posture, or SLUMPED posture.

5. The method includes the step of positioning the heel of the shoe section 62 for the design template 10 of the medium male having one of the ERECT posture, NEUTRAL posture, or SLUMPED posture in the vehicle package. Since the design template 10 represents the human body occupant in a seat, the vertical and horizontal location of the hip joint 26 for the medium male ($Hpt^{50}$) is defined in an occupied seat of a vehicle package based on a predetermined class of vehicles for the design template 10 of the medium male. The horizontal location of $Hpt^{50}$ in the vehicle package is defined by the position of the heel on the floorpan 14 and the comfort angles (Table 2) of the ankle, knee, and thigh that control the relative orientations of the shoe section 62, calf section 52 and thigh section 44 of the design template 10 of the medium male. The vertical location of $Hpt^{50}$ is defined by the height from the floorpan 14 to center of the circle defined by the hollow bolt and nut 45a of the design template 10 of the medium male. Since the forces on the occupied seat under hip joint 26 at $I_D^O$ 30 are determined by torso size and torso angle, the vertical space in the centerline of the seat 12 available for supporting seat structures is defined by the vertical height of the interface portion 23a of the outer contour of the design template 10 from the floorpan 14. Torso angle is selected to accommodate eye vision and head clearance of the medium male in the vehicle package based on the height available in a predetermined class of vehicles from the floorpan 14 to the headliner 70. After optimally positioning the design template 10 of the medium male, measure the two-dimensional coordinates of "$I_D$" 30 of the design template 10 of the medium male having one of the ERECT posture, NEUTRAL posture, or SLUMPED posture.

6. The method includes the step of constructing an ischial patch 160 to be described on the unoccupied seat 12 for each occupant in the vehicle package. After considering seat deflection for each of the above design templates 10, construct a point that best fits the location of each "$I_D$" 30 for the design template 10 of the small female, medium male, and large male on the unoccupied seat surface. The ischial patch on the unoccupied seat surface is the line that best fits the location of all "$I_D$" 30 locations on the unoccupied seat surface.

Seat Design

A method for designing a seat, according to the present invention, is disclosed. In general, the method includes the steps of selecting at least one design template 10 having a torso section 22 being one of the large male, medium male, and small female having either the ERECT posture, NEUTRAL posture, or SLUMPED posture and having a leg section. The leg section is made up of the thigh section 44, calf section 52, and shoe section 62. The method also includes the step of forming load supporting contours and unloaded patches to be described on the seat 12 for at least one design template 10. The forces acting on the occupied ($^O$) seat 12 are distributed into load support points in each design template 10 that are used to define the thorax ($S^O$), lumbar ($L^O$), ischium ($I_D^O$), and thigh ($T^O$) load support points (FIG. 12) in the seat 12.

For example, select the design template 10 of the large male having the NEUTRAL posture with the leg section attached. After using the NEUTRAL posture, proceed to accommodating the ERECT posture. The SLUMPED posture should be supported in every seat 12, but not encouraged by any poor design effects in the seat 12.

The orientation of the pelvis changes with each of the three postures. In the ERECT posture, the pelvis is rotated forward so that "$I_D$" 30 is closer to the most anterior point on the ischium (I1). In the SLUMPED posture, the pelvis is rotated rearward so that "$I_D$" 30 is closer to the most posterior point on the ischium (I2). Thus, as the orientation of the pelvis changes with posture, critical design landmarks, i.e., $I_D$ 30, change their location.

1. The method includes the step of optimally adjusting the heel point, hip joint 26, and comfort angles (Tables 1 and 2) of the design template 10 to define the occupied position of the occupant in the seat 12 in the vehicle environment.

2. The method includes the step of defining points at S, L, $I_D$ and T on the unoccupied seat surface of the seat 12 that corresponds biomechanically to the equivalent points on the occupied seat 12 after adjusting for seat stiffness in the vehicle environment.

3. The method also includes the step of estimating a point on the occupied seat interface contour at T4 on the design template 10 when the occupant is sitting in the seat 12. For example, in the large male having the ERECT posture, mark the T4 (FIG. 12) at the T4 spinal landmark (34c) by constructing the shortest line between the center of the vertebral hole for T4 (34c) and the interface contour 23a line. Mark the intersection of the two lines to represent the location of T4 (34c) in the occupied seat on the unoccupied surface of the seat 12.

4. The method also includes the step of estimating a first point on the occupied seat interface contour at $S^O$ on the design template 10 under occupant load. For example, in the large male having the NEUTRAL posture, mark $S^O$ (FIG. 12) at T8 (34e) by constructing the shortest line between the center of the vertebral hole and the interface contour 23a line. Mark the intersection of the two lines to represent the thorax load support point So.

5. The method also includes the step of estimating a second point on the unoccupied seat interface contour at $S^U$. For example, in the large male having the NEUTRAL posture, estimate the deflection at $S^O$ by using the appropriate value from FIGS. 13 through 16. The displacement of $S^O$ to $S^U$ is normal to the tangent at the T8 (34e) back contour point.

6. The method also includes the step of estimating a first point on the occupied seat interface contour at $L^O$ on the design template 10 under occupant load. For example, in the large male having the NEUTRAL posture mark $L^O$ (FIG. 12) at L4 (34k) by constructing the shortest line between the center of the vertebral hole and the interface contour 23a line. Mark the intersection of the two lines to represent the lumbar load support point L°.

7. The method also includes the step of estimating a second point on the unoccupied seat interface contour at $L_U$. For example, in the large male having the NEUTRAL posture, by using the appropriate value from FIGS. 13 through 15, estimate the deflection at L°. The displacement of $L^O$ to $L^U$ is normal to the tangent at the L3 back contour point. In the ERECT posture for a seat back without an adjustable lumbar support, $L^U$ should not contact the seat back 20. In the NEUTRAL posture, $L^U$ should be deflected in the seat back 20. In the SLUMPED posture, the design template 10 should make contact with the seat back 20 at $L^U$.

8. The method also includes the step of estimating a point on the occupied seat interface contour at $B^O$ on the design template 10 with the occupant sitting on the seat 12. For example, in the large male having the NEUTRAL posture, mark $B^O$ (FIG. 12) on the bite line by constructing the shortest line between the center of the vertebral hole 120 (FIG. 17A) and the interface contour 23a line. Mark the intersection of the two lines to represent the bite line.

9. The method includes the step of estimating a first point on the occupied seat interface contour at $I_D^O$ on the design template 10 under occupant load. The $I_D^O$ is the lowest tangential point under the ischium projected onto the interface contour 23a.

10. The method includes the step of estimating a second point on the unoccupied seat interface contour at $I_D^U$. For example, in the large male having the NEUTRAL posture, estimate the undeflected $I_D^U$ by adding the appropriate value (e.g., FIGS. 14 through 16 for the NEUTRAL posture) to the vertical dimension of the deflected $I_D^O$.

11. The method includes the step of estimating a first point on the occupied seat interface contour at $T^O$ on the design template 10 under occupant load. Mark the thigh center of gravity (CG) on the thigh link axis 48, 4/9's of the thigh link length from the hip joint 26, and construct a line vertically downward (parallel to the gravity vector) to the contour on the thigh. The intersection of these two lines represents $T^O$ (FIG. 12).

12. The method includes the step of estimating a second point on the unoccupied seat interface contour at $T^U$. For example, at $T^O$, construct a circle with a radius equal to the thigh deflection value from FIG. 16 where thigh weight for each human body is found in Table 5. Mark the point at the highest horizontal tangent to the circle about the deflected $T^O$ point. Record the coordinates of highest tangential point.

TABLE 5

Seat Cushion Design Parameters for 3 Template Body Sizes.

| DESIGN PARAMETERS | OCCUPANT DIMENSION | Small Female | Medium Male | Large Male |
|---|---|---|---|---|
| Occupant Support Surface | Contact Width | Anthropometry: Hip Width | Leg Splay | Leg Splay |
| | Thigh CG from Hpt | 162 mm | 189 mm | 207 mm |
| Cushion Deflection | Thigh Weight | 4.0 kg (8.8 lbs) | 6.2 kg (13.6 lbs) | 8.0 kg (17.6 lbs) |
| | Seat Deflection | FIG. 16 | FIG. 16 | FIG. 16 |

13. The method includes the step of plotting locations of shoulder, $S^U$, $L^U$, $B^U$ $I_D^U$, and $T_U$ to form the unoccupied seat patches 160 (FIG. 23) to be described on the seat 12 with the design template 10 at the shoulder, chest, lumbar, biteline, ischial and thigh patches 160 to be described.

14. The method includes the step of optimally matching the unoccupied seat patch points ("A", $S^U$, $L^U$, $B^U$, $I_D^U$, and $T^U$) for the other design templates 10 and postures to define the free, unoccupied seat patches 160 in the seat 12.

15. The method also includes the step of defining the area for the seat suspension in the seat 12. The furthest forward and the furthest rearward ischial load points ($I_D^O$) from all design templates 10 determine the area for greatest deflection of the seat suspension. In general, the large male having the SLUMPED posture and the small female having the ERECT posture define the limits. Record the coordinates of the $I_D^O$ points in the vehicle axis system and construct a best-fit line to define the occupied load support zone for the ischium.

16. The method also includes the step of defining the waterfall region of the unoccupied seat 12. The waterfall at this bolster region should be designed so that the contour from $T^U$ to the edge of the seat 12 diminishes with only trim contacting the back of the calf in the seated design template 10 of the small female having the ERECT posture.

The Seat

The seat 12 is composed of two structural members: (1) a seat cushion 18 that primarily supports the human body occupant's torso weight under the ischium and the weight of the human body occupant's thigh, and (2) a seat back 20 that supports the human body occupant's back primarily in the thoracic and lumbar regions. The seat cushion 18 is typically composed of five primary structures: a) upholstery or trim, typically a woven cloth material or leather; b) deformable pad, typically foam; c) a suspension under the butt pocket, typically metal springs attached to metal wires and/or straps; d) an anti-submarining region forward of the suspension; and e) a rigid frame, typically sheet metal with sufficient shape and strength to support the human body occupant load. The seat back 20 is typically composed of four primary structures and one optional structure: a) upholstery or trim, typically a woven cloth material or leather covering of the seat back 20; b) deformable pad, typically foam; c) a rigid frame, typically a tube of metal in an inverted U-shape; d) a structural cross member spanning the vertical frame near the base of the seat back 20 to prevent occupant penetration of the seat back 20 in a vehicle collision; and e) an optional lumbar support, typically a deformable basket or inflatable bag(s) support the lumbar region of the human body occupant.

The design templates 10 are used to define the loaded contours of the seat 12 and the location of supporting and restraining structures, or their absence, as required for different postures and different body sizes. The design templates 10 are positioned relative to preferred torso angles (Tables 2 and 3). In general, the ERECT posture will sit in a range from 6° to 18°, NEUTRAL in a range from 8° to 22° and SLUMPED in a range from 12° to 26°. The $I_D$ point lies on an inclined plane that is defined by the change in weight transmitted from the seat cushion 18 to the seat back 20 as the human body occupant changes postures from ERECT to SLUMPED. The inclination of the seat cushion 18 is defined by thigh angle (Table 2).

A method, according to the present invention, is disclosed of using the design template 10 to design the seat 12 for a motor vehicle. In general, the method includes the steps of providing the design template 10 having the torso section 22 being one of a group comprising the large male, medium male, and small female having either an ERECT posture, a NEUTRAL posture, or a SLUMPED posture. The method includes the steps of establishing occupant accommodation criteria in a vehicle package based on a predetermined class of vehicles and positioning the design template 10 in a vehicle to define seat position to accommodate each design template 10 on a seat 12 having a deformable seat cushion 18 and a deformable seat back 20 in a vehicle representing the vehicle package criteria. The method also includes the step of defining at least one from a group comprising unloaded patches 160 to be described on the seat 12 at the shoulder, $S^U$, $L^U$, $B^U$, $I_D^U$, and $T^U$. The method further includes the step of defining at least one from a group comprising a seat back height, seat cushion length, head restraint position, shoulder patch 160, thorax patch 160, lumbar patch 160, bite line patch 160, ischial patch 160, thigh patch 160, seat cushion bolster (e.g., wings), and seat suspension for the seat 12 relative to the design template 10.

Seat Back Height

The method includes the step of defining a seat back height for the seat 12 relative to the design template 10.

1. Seat back height should not be less than the height of the top of the shoulder patch to be described.

Head Restraint Position

The method includes the step of defining a head restraint position for the seat 12 relative to the design template 10.

1. The back of the head at the location of a center of mass of the head for the torso section 22 of the large male having the ERECT posture defines the lowest maximum height of the head restraint.

2. The back of the head for the torso section 22 of the small female having the ERECT posture defines the most anterior position of the head restraint.

Shoulder Patch

The method includes the step of defining a shoulder patch 160 for the seat 12 relative to the design template 10.

1. The highest and lowest T4 locations from the large and medium males define the area of the T4 patch 160. In general, the T4 point in the large male having the ERECT posture and the T4 point in the medium male having the SLUMPED posture design templates 10 define the limits.

Thorax Patch

The method includes the step of defining a thorax patch 160 for the seat 12 relative to the design template 10.

1. The highest and lowest thorax load points ($S^u$) from all design template contours define the area of thorax patch 160. In general, $S^u$ at T8 in the large male having the ERECT posture and T8 in the small female having the SLUMPED posture design templates 10 define the limits.

Lumbar Patch

The method includes the step of defining a lumbar patch 160 for the seat 12 relative to the design template 10.

1. The highest and lowest lumbar load points ($L^u$) from all design template contours define the area of the lumbar patch 160. In general, $L^u$ at L4 in the large male having the ERECT posture and L4 in the small female having the SLUMPED posture design templates 10 define the limits.

2. Structural mechanics of the deformable pad of the seat back 20 are designed so that the pad bends easily at $T12^O$ for the torso section 22 of the large male having the ERECT posture and at $S1^O$ for the torso section 22 of the large male having the ERECT posture.

3. The horizontal displacement of an adjustable lumbar support should lie midway at the lumbar patch 160 for the torso section 22 having the highest L4 and the torso section 22 having the lowest L4 in the occupied seat.

4. The vertical displacement of an adjustable lumbar support should be at least the total length of the lumbar patch 160 where the lowest L4 for the torso section 22 and the highest L4 for the torso section 22 define the limits.

Ischial Patch

The method includes the step of defining an ischial patch 160 for the seat 12 relative to the design template 10.

1. After considering seat deflection for each of the above design templates 10, construct a point that best fits the location of each "$I_D$" 30 for the design template 10 of the small female, medium male, and large male on the unoccupied seat surface. The ischial patch 160 on the unoccupied seat surface is the line that best fits the location of all "$I_D$" 30 locations on the unoccupied seat surface of the seat 12.

Thigh Patch

The method includes the step of defining a thigh patch 160 for the seat 12 relative to the design template 10.

Bite Line Patch

The method includes the step of defining a bite line patch 160 for the seat 12 relative to the design template 10.

1. The highest and lowest bite line load points ($B^u$) from all design template contours define the area of the bite line patch 160. In general, $B^u$ at the hip joint 26 in the large male having the ERECT posture and the hip joint 26 in the small female having the SLUMPED posture design templates 10 define the limits.

2. Structure in the seat back 20 to restrain rearward motion of the human body occupant into the seat back 20 should lie within the region bounded by S1 for the torso section 22 of the large male having the ERECT posture and S1 for the torso section 22 of the small female having the NEUTRAL posture.

3. No non-deformable structures should be placed in the seat back 20 within an x distance defined by seat stiffness and any load predicted by a biomechanical model.

Seat Suspension

The method includes the step of defining a seat suspension for the seat 12 relative to the design template 10.

1. The furthest forward and the furthest rearward ischial load points $I_D{}^O$ for the torso section 22 from all design templates 10 determine the area for the seat suspension. In general, the design templates 10 for the large male having the SLUMPED posture and the small female having the ERECT posture define the limits.

2. The forces on the seat suspension are determined from the torso angle for each design template 10 (FIGS. 13 through 16).

Anti-Submarining Structures

The method includes the step of defining a region in the forward part of the seat cushion 18 that prevents forward motion of the pelvis in a vehicle collision.

1. The anti-submarining region in the seat cushion 18 lies between the most forward point of the seat suspension and the frame of the seat 12 at the nose of the seat cushion 18. In general, this anti-submarining region does not support vertical loads from human body weight but acts to restrain the forward horizontal motion of the human body occupant in a collision environment. It is therefore, important, that the anti-submarining region have low resistance to vertical loads.

2. In addition, the anti-submarining region in the seat cushion 18 has a vertical barrier in the seat frame at the nose of the seat cushion 18 to prevent horizontal motion of the ischium 30 of the design template 10 past the nose of the seat cushion 18. The design template 10 having the greatest penetration into the seat cushion 18 at this point determines the minimum height of this vertical barrier in the seat frame.

3. The forces on the vertical barrier are determined by the impact conditions and the size of the human body occupant. Thus, the structural materials and their strength must comply with any federal or state regulations concerning forces acting on the restraint system in a motor vehicle.

Seat Cushion Length

The method includes the step of defining a seat cushion length for the seat 12 relative to the design template 10.

1. Seat cushion length should not exceed a plane tangent to the back of calf of the small female.

Cross-Sectional Sections

Referring to FIGS. 17A through 19F, another embodiment, according to the present invention, of the design template 10 is shown. In this embodiment, the design template 10 also includes at least one, preferably a plurality of cross-sectional sections, generally indicated at 100, cooperating with the torso sections 22 at anatomical landmarks to provide a three-dimensional design template used for designing, evaluating, and measuring human occupant accommodation and seating in a seated environment. The cross-sectional sections 100 are dimensionally accurate to simulate or represent human body size of the small female (FIGS. 17A through 17F), medium male (FIGS. 18A through 18F), and large male (FIGS. 19A through 19F). The cross-sectional sections 100 are made of any suitable media to represent the cross-section of a human body occupant. For example, the media may be electronic, paper, wood, plastic, or the like. It should be appreciated that, if the cross-sectional sections 100 and torso sections 22 are made of a rigid material, the sections 100 and 22 would have slots or cut-outs (not shown) therein to allow them to be assembled together in a three-dimensional shape.

The cross sectional sections 100 of the design template 10 describe the contours of the seat 12 at specific anatomical landmarks or locations (A, S, L, B, $I_D$, and T) that are defined in the design template 10. These anatomical landmarks in the centerline contour of the design template 10 represent the location at which point forces can be calculated to estimate the amount of seat deflection of the seat 12 at each location. With the addition of these cross-sectional sections 100, the design template 10 more accurately defines the shape of the occupied and unoccupied free seat contours of the seat 12. These cross-sectional sections 100 describe the shape of the body seat interface and important skeletal landmarks.

Figure 17A:
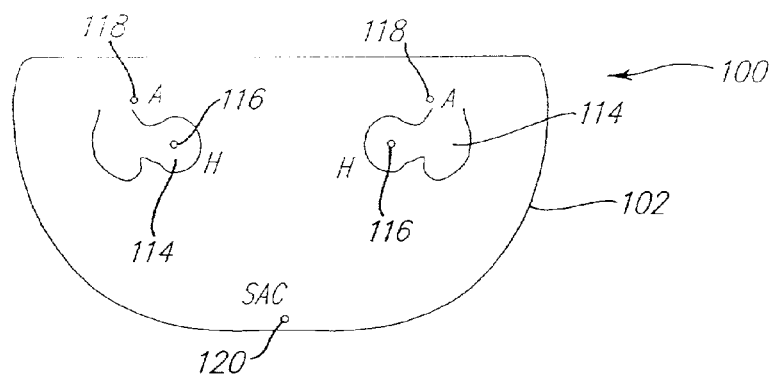
FIG. 17A is a "B" cross-sectional section for a small female of the design template of FIG. 1.
Figure 17B:
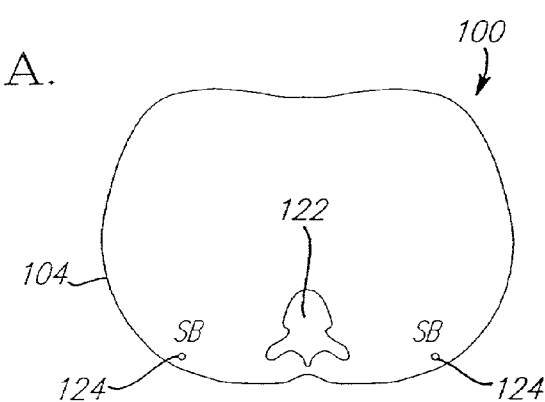
FIG. 17B is an "S" cross-sectional section for a small female of the design template of FIG. 1.
Figure 17C:
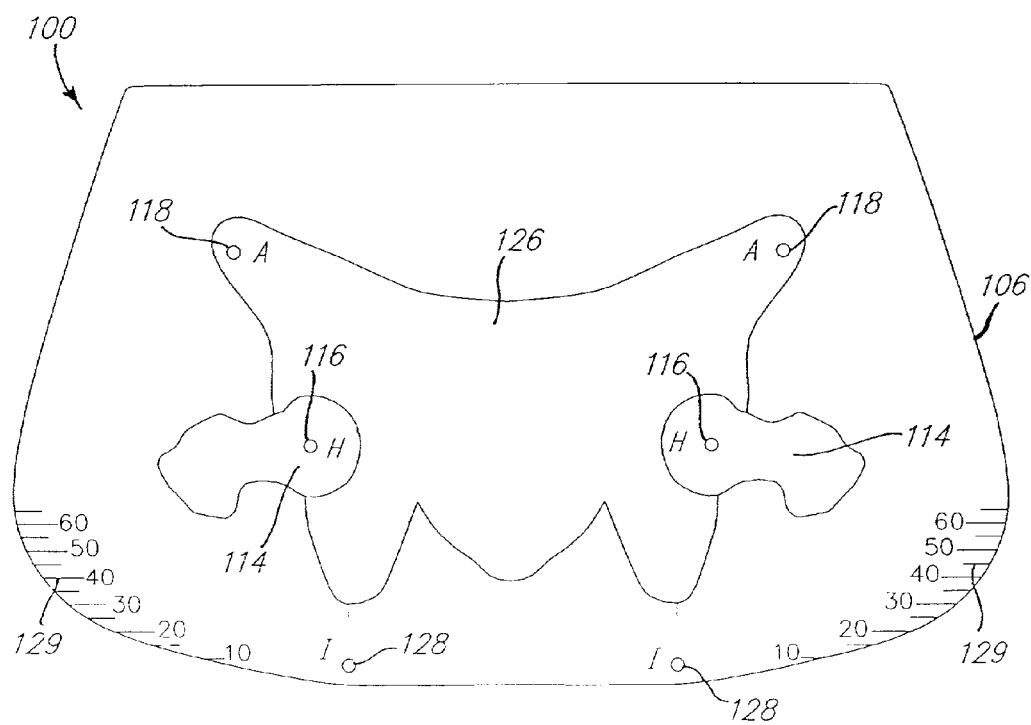
FIG. 17C is an "$I_D$" (i.e. pelvis) cross-sectional section for a small female of the design template of FIG. 1.
Figure 19A:
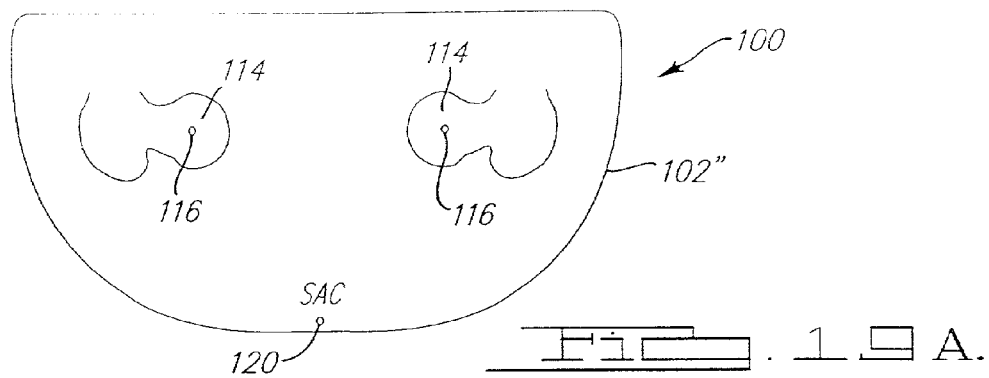
FIG. 19A is a "B" cross-sectional section for a large male of the design template of FIG. 1.
Figure 19B:
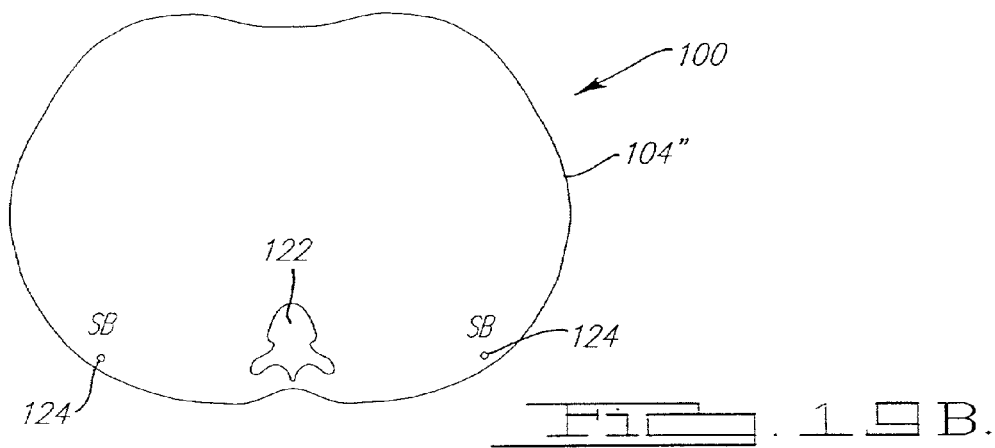
FIG. 19B is an "S" cross-sectional section for a large male of the design template of FIG. 1.
Figure 19C:
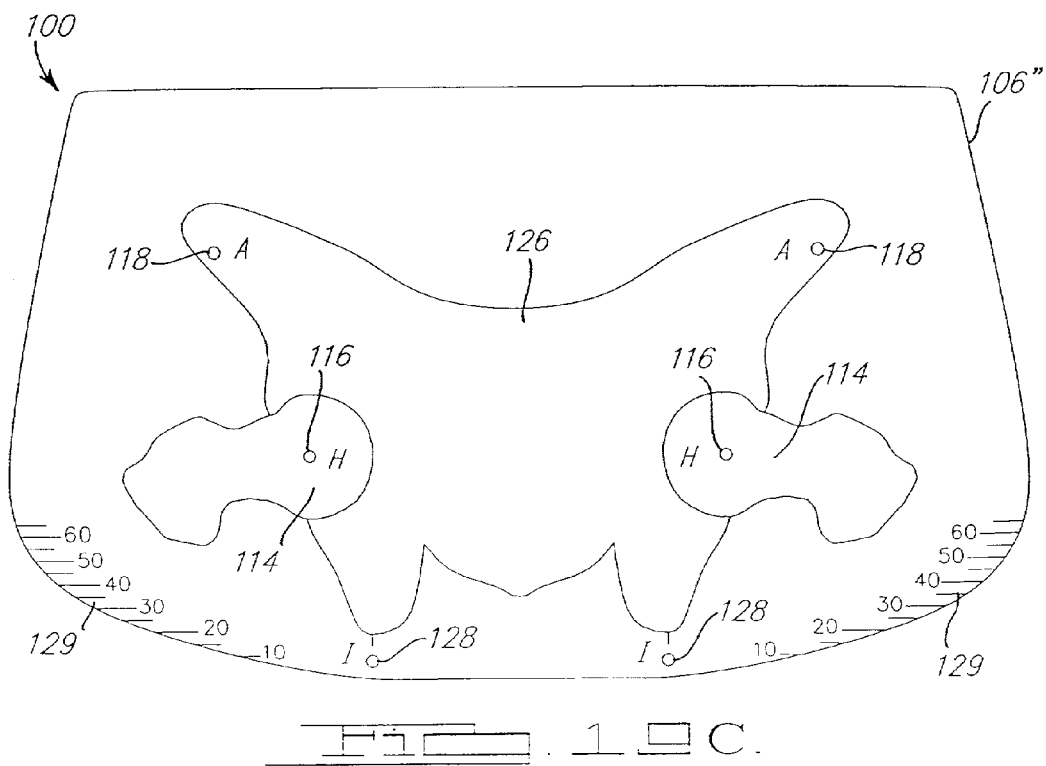
FIG. 19C is an "$I_D$" (i.e., pelvis) cross-sectional section for a large male of the design template of FIG. 1.

The cross-sectional sections 100 of the design template 10 represent six sections of the human body of the occupant, that is, four through the torso to assist with development of the seat back 20 and two through the lower body at the pelvis and thighs to assist with development of the seat cushion 18 of the seat 12. The cross-sectional sections 100 are:

section 102, 102', 102" or "B" at the hip joint horizontally through the torso in the buttocks region of the back as illustrated in FIGS. 17A, 18A, 19A, respectively;

section 104, 104', 104" or "S" at T8 horizontally near the apex of the shoulder blades or chest for torso support as illustrated in FIGS. 17B, 18B, 19B, respectively;

section 106, 106", 106" or "$I_D$" vertically through the pelvic ischium in the buttock region as illustrated in FIGS. 17C, 18C, 19C, respectively;

section 108, 108', 108" or "L" at L3 horizontally in the lumbar region for lumbar support as illustrated in FIGS. 17D, 18D, 19D, respectively;

section 110, 110', 110" or "A" at T4 horizontally near the broadest portion of the deltoid muscle in the shoulder as illustrated in FIGS. 17E, 18E, 19E; and section 112, 112', 112" or "T" at the thigh center of gravity (CG) region as illustrated in FIGS. 17F, 18F, 19F, respectively.

It should be appreciated that measuring the cross-sectional shape of the occupant is required for the cross-sectional sections 100. It should also be appreciated that since body tissues are deformable, especially at the B, $I_D$, T, and L sections, measuring the shape of the deformed tissue is important.

To correlate transverse shape of the body with body size of the occupant, the torso section 22 of the design template 10 is defined along a sagtittal plane of the occupant and is based on stature, which is the dimension of most importance for that view. For the cross-sectional sections 100 of the design template 10, the shape is based on weight, so that, for example, for the large male cross-sectional sections 102", 104",106",108",110",112", the data represents a combination of large height as well as large weight. This means that the individual at the small and large ends of the size spectrum in the torso section 22 will actually represent smaller and larger individuals by percentile in the population. Namely, by combining, for example, the small female torso section 22 with the small female cross-sectional sections 102,104,106,108,110,112, the small female will represent approximately 2.5% of the population. Likewise, by combining, for example, the large male torso section 22 with the large male cross-sectional sections 102",104", 106", 108",110",112", the large male will represent approximately 97.5% of the population.

Regarding posture, an analysis was done on the differences between ERECT, NEUTRAL, and SLUMPED posture for the cross-sectional sections 100. The variance in shape was found to be small and therefore the cross-sectional sections 100 of the design template 10 are based on measurements of the NEUTRAL posture but are still applicable to the ERECT and SLUMPED postures.

Regarding the vertebral level of the applied force, the shape of the torso over the vertebral levels described is small, thus the shape at T8 is similar to the shape at T6 and T10, with the differences between large through small far outweighing the minor differences in body shape as a result of cross-sectional shape.

The cross-sectional sections 100 include indicia of skeletal landmarks relative to a seated human body occupant. For example, the B cross-sectional section 102,102',102" includes a femur head 114 having a hip joint 116 and a line axis connected therebetween. The B cross-sectional section 102,102',102" also includes indicia for the most anterior portion on the top of a pelvis of a human body occupant, which is the anterior superior iliac spine (ASIS), point A 118. The B cross-sectional section 102,102',102" further includes indicia representing pelvic symphysis 120. It should be appreciated that the hip joint 116 is referred to as the H-point in SAE seat design practice. It should also be appreciated that the hip joint 116 is a ball-and-socket joint connecting the thigh to the pelvis of a human body occupant. It should further be appreciated that the hip joint 116 corresponds to the hip joint 26 of the torso section 22 and that other similar indicia between the sections 100 and sections 22 correspond to each other.

In another example, the S cross-sectional section 104, 104',104" includes spinal landmarks such as vertebrae 122 marked along the back thereof. The vertebrae 122 are for the neck (cervical spine) indicating C7, chest (thoracic spine) indicating T2, T4, T6, T8, T10, T12, referred to as point S, low back (lumbar spine) indicating L1 through L5, respectively, referred to as point L, and sacrum (attaches the spine to the pelvis) indicating S1. The S cross-sectional section 104,104',104" includes indicia for the scapula represented by point SB 124.

In yet another example, the $I_D$ cross-sectional section 106,106',106" includes indicia representing the femur head 114 having the hip joint 116 and the anterior superior iliac spine (ASIS), point A 118. The $I_D$ cross-sectional section 106,106',106" also includes indicia representing a pelvis 126. The $I_D$ cross-sectional section 106,106',106" includes indicia representing point $I_o$ 128 as the lowest point on a ischial tuberosity projected to the interface contour of the occupied seat. The $I_D$ cross-sectional section 106,106',106" further includes indicia representing a linear scale 129 for hip angle.

In still another example, the L cross-sectional section 108,108',108" includes indicia representing the vertebrae 122.

In a further example, the A cross-sectional section 110, 110',110" includes indicia representing the vertebrae 122 and the point SB 124. The A cross-sectional section 110, 110',110" includes indicia representing the shoulder joint point SH 130. The A cross-sectional section 110,110',110" includes indicia representing a suprasternal (top of sternum), point SS 132.

In yet a further example, the T cross-sectional section 112,112',112" includes indicia representing a linear scale 134 for thigh angle.

Strain Strip

Figure 24:
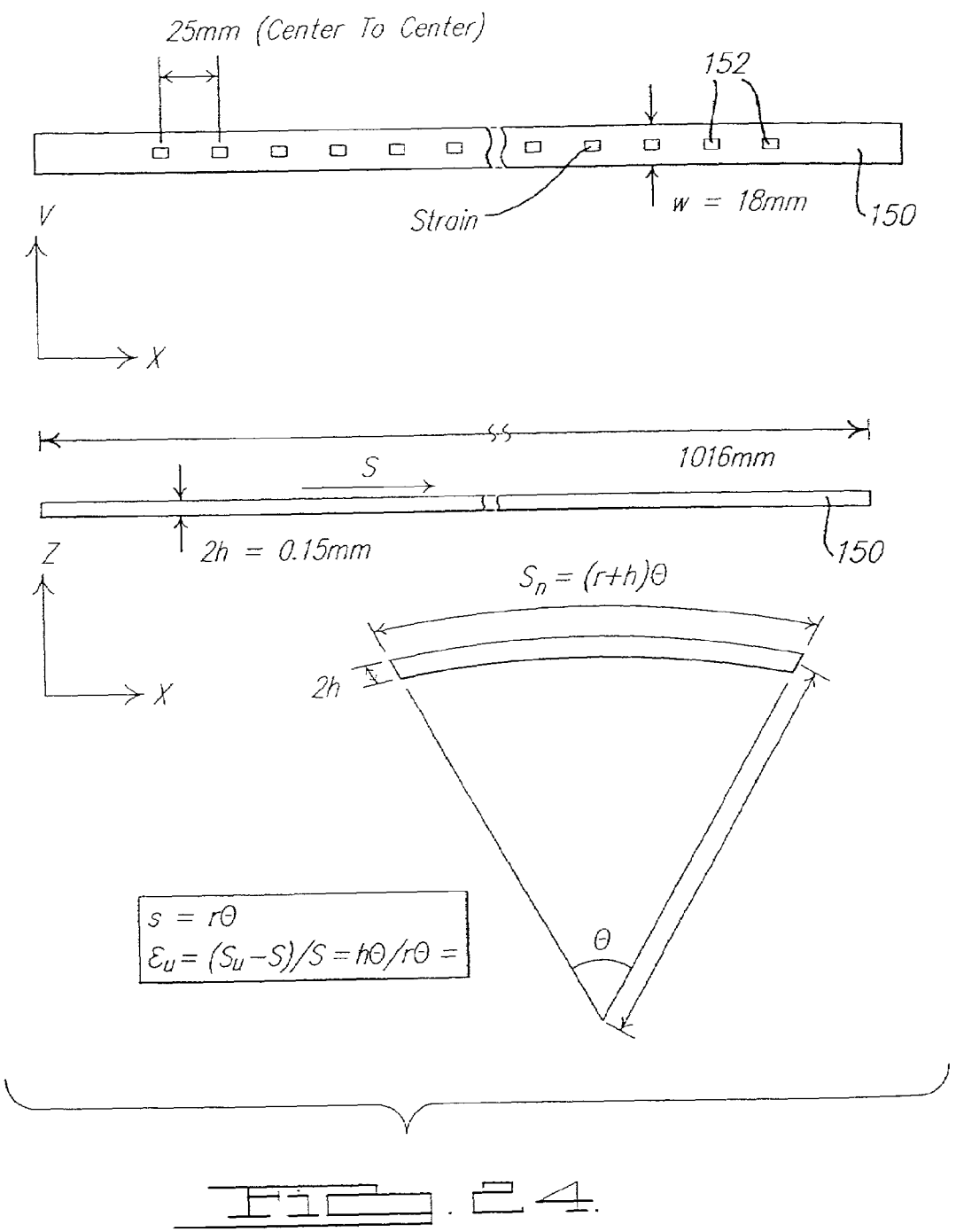
FIG. 24 is a diagrammatic view of a strain strip design.

Referring to FIG. 24, a strain strip 150 was constructed to aid in the measurements to be described. The strain strip 150 was made of a metal material such as stainless steel having a predetermined thickness (0.15 mm thick) and predetermined width and length (18 mm×914 mm). The strain strip 150 was fit with a predetermined number, preferably twenty-four (24), strain gauges 152 (2-element 90° 'tee' rosette 7.9×7.9 mm). The strain gauges 152 were mounted at predetermined intervals such as twenty-five millimeters (25 mm) on the strain strip 150. It should be appreciated that a distance s, is measured along the strain-gauge surface of the strain strip 150.

In one embodiment, two elements of each strain gauge 152 are connected in a half-Wheatstone bridge configuration with bridge completion resistors (not shown) located in an amplifier (not shown), approximately 2 m away. Noise was assumed to be a high common-mode and thus cancelled at the bridge. The thermal characteristics of the strain gauges 152 were matched to those of the strain strip 150 and the effects of strain due to temperature drift were also cancelled at the bridge.

Curvature and Strain

Figure 25:
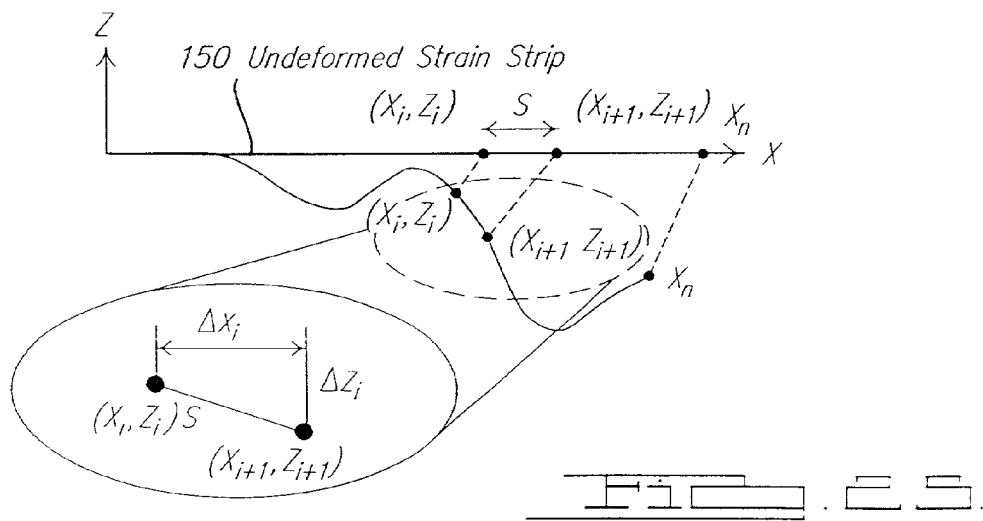
FIG. 25 is a diagrammatic view of estimating shape.

Assuming a thin strip of homogenous material for the strain strip 150, the bending strain, e, is related to the local curvature and the second derivative of the deflection:

$$e(s) = -h/R \cong -h\{d^2v(s)/ds^2\} \tag{1}$$

where s is the position along the centerline of the strain strip 150 (FIG. 25), h is half the thickness of the strain strip 150, R is the radius of curvature at s and v(s) is the deflection of the strain strip 150 from the original undeformed state. Thus, given e(s), the radius of curvature can be determined. For small strains, $v(s) \sim z(x)$ and $e(s) \sim e(x)$ so that $e(x) = z''(x)$. It should be appreciated that the position of $(x_{i+1}, z_{i+1})$ can be determined if $(x_i, z_i)$, $(x'_i, z'_i)$, $z''_i$ and $z''_{i+1}$ are known (where $z''_i = e_i$ and $z''_{i+1} = e_{i+1}$). It should also be appreciated that with deformation, the x-values (i.e., $x_i$, $x_{i+1}$, and $x_n$) shift to new positions along the x-axis.

The (x,z) shape can be determined if the strain between two points is assumed to be constant and if the position and first derivative are known for one of the points. Expressing z(x) of the strain strip 150 as a cubic spline then:

$$z_i = a_i x^3 + b_i x^2 + c_i x + d_i \tag{2a}$$

$$z'_i = 3a_i x^2 + 2b_i x + c_i \tag{2b}$$

$$z''_i = 6a_i x + 2b_i \tag{2c}$$

where $z'' = e(x)$. At node "i+1" of the cubic spline it is assumed that:

$$a_i x^3_{i+1} + b_i x^2_{i+1} + c_i x_{i+1} + d_i = a_{i+1} x^3_{i+1} b_{i+1} x^2_{i+1} + c_{i+1} x_{i+1} + d_{i+1} \tag{3a}$$

$$3a_i x^2_{i+1} + 2b_i x_{i+1} + c_i = 3a_{i+1} x^2_{i+1} + 2b_{i+1} x_{i+1} + c_{i+1} \tag{3b}$$

$$6a_i x_{i+1} + 2b_i = 6a_{i+1} x_{i+1} + 2b_{i+1} \tag{3c}$$

Equation (2) can be written in matrix form as:

$$[Z_i] = [X_i][A_i] \tag{4}$$

where $[Z_i] = \begin{bmatrix} z_i & z'_i & z''_i & z'_{i+1} \end{bmatrix}^T$ $[A] = \begin{bmatrix} a_i & b_i & c_i & d_i \end{bmatrix}^T$ and $$= \begin{bmatrix} x_i^3 & x_i^2 & x_i & 1 \\ 3x_i^2 & 2x_i & 1 & 0 \\ 6x_i & 2 & 0 & 0 \\ 6x_{i+1} & 2 & 0 & 0 \end{bmatrix}$$

The equation for the cubic spline can be determined if $z_i$, $z'_i$, $z''_i$, $z''_{i+1}$, $x_i$, and $x_{i+1}$ are known. An examination of FIG. 25 indicates that $x_{i+1}$ can be estimated as a function of $x_i$, and $z'_i$:

$$x_{i+1} = x_i + s \cos(\operatorname{atan}(z'_i)) \tag{5}$$

where s is the distance between $x_i$ and $x_{i+1}$ when the strain strip 150 is undeformed.

After estimating $x_{i+1}$, the variables $[a_i, b_i, c_i, d_i]$ can be solved by inverting the matrix $[x_i]$. Then, Equation (2a) is used to solve for $z_{i+1}$ and Equation (2b) to solve for $z'_{i+1}$. The process is repeated, providing an initial estimate for the $(x_i, z_i)$ values for all points of the strain gauges 152. It should be appreciated that the initial estimate is good for strain gauges 152 close to known points, but errors increase and are cumulative and thus provide a progressively poor estimate for the deflection of the strain strip 150 for strain gauges 152 further from known points.

The method is improved through a two-step process:

a) weighted averaging of an initial left to right and right to left estimate; and b) values from step a) are used in an over-determined equation to better estimate the deflection (z-values) of each strain gauge 152 using a quintic spline fit over successive groups of four strain gauge points as follows:

$$z_j = a_j x_j^5 + b_j x_j^4 + c_j x_j^3 + d_j x_j^2 + e_j x_j + f_j \tag{6a}$$

$$z_j' = 5a_j x_j^4 + 4b_j x_j^3 + 3c_j x_j^2 + 2d_j x_j + e_j \tag{6b}$$

$$z_j' = 20a_j x_j^3 + 12b_j x_j^2 + 6c_j x_j + 2d_j \tag{6c}$$

$$z_{i+1} = a_j(x_{i+1})^5 + b_j(x_{i+1})^4 + c_j(x_{i+1})^3 + d_j(x_{i+1})^2 + e_j(x_{i+1}) + f_j \tag{6d}$$

$$z_{i+1}' = 5a_j(x_{i+1})^4 + 4b_j(x_{i+1})^3 + 3c_j(x_{i+1})^2 + 2d_j(x_{i+1}) + e_j \tag{6e}$$

$$z_{i+1}'' = 20a_j(x_{i+1})^3 + 12b_j(x_{i+1})^2 + 6c_j(x_{i+1}) + 2d_j \tag{6f}$$

$$z_{i+2} = a_j(x_{i+2})^5 + b_j(x_{i+2})^4 + c_j(x_{i+2})^3 + d_j(x_{i+2})^2 + e_j(x_{i+2}) + f_j \quad (6g)$$

$$z_{i+2}' = 5a_j(x_{i+2})^4 + 4b_j(x_{i+2})^3 + 3c_j(x_{i+2})^2 + 2d_j(x_{i+2}) + e_j \quad (6h)$$

$$z_{i+2}'' = 20a_j(x_{i+2})^3 + 12b_j(x_{i+2})^2 + 6c_j(x_{i+2}) + 2d_j \quad (6i)$$

$$z_{i+3} = a_j(x_{i+3})^5 + b_j(x_{i+3})^4 + c_j(x_{i+3})^3 + d_j(x_{i+3})^2 + e_j x_{i+3} + f_j \quad (6j)$$

$$z_{i+3}' = 5a_j(x_{i+3})^4 + 4b_j(x_{i+3})^3 + 3c_j(x_{i+3})^2 + 2d_j(x_{i+3}) + e_j \quad (6k)$$

$$z_{i+3}'' = 20a_j(x_{i+3})^3 + 12b_j(x_{i+3})^2 + 6c_j(x_{i+3}) + 2d_j \quad (6l)$$

where i denotes the $i^{th}$ strain gauge 152. For nodes in the middle of the strain strip 150, equations (6a, 6b, 6c, 6f, 6i, 6j, 6k, 6l) are used in combination with continuity requirements. For nodes at the beginning or end of the strain strip 150, known values for z, z' and z'' are used. It should be appreciated that, from the above general node equations, a complete set of over-determined equations were developed.

Measurements

The contour shape of the seated occupant changes with load and thus posture and leg position plays an important role. A three-dimensional design template 10 was developed for three body types: small female, average male, and large male with the deformable tissue in the deflected shape for a seated posture. As a result, these cross-sectional sections 100 are based upon measurements of approximately twenty (20) human occupants for each of the three body sizes (large male ($95^{th}$ percentile), medium male ($50^{th}$ percentile), small female ($5^{th}$ percentile)). A total of thirty-nine (39) male occupants and twenty-two (22) female occupants were recruited and measured. In order to simulate a driving posture and allow for instrumentation and measurements, the seat 12 was constructed with dimensions for heel-point to $I_D$ 30 and $I_D$ 30 to steering wheel center taken from a mid-size automotive vehicle (not shown). Cross sections of the occupants were measured one at a time and anatomical landmarks were measured so that the relative locations of cross sections could be reconstructed.

Thigh and Buttock Shape Measurements

The seat 12 had foam pads on both the seat cushion 18 and seat back 20. In this configuration the seat pan for the seat cushion 18 was inclined at approximately eighty degrees (80°) and the seat back 20 was attached with a back angle of approximately one hundred eighty degrees (180°). Foam pads (100 mm thick and 450 mm×550 mm in width and length) were placed on the seat cushion 18 and seat back 20. A pressure mat and strain-shape measurement system incorporating the strain strip 150 was placed on the seat cushion 18 and/or seat back 20. Occupants sat on the flat foam cushions and thigh and buttock shapes were measured with the occupant sitting in a NEUTRAL posture, thigh angle at approximately seven degrees (7°) and knee angle at approximately one hundred thirty-five degrees (135°) The strain strip 150 was positioned at the level of the appropriate anatomical landmark (A T4; S T8; L L3; B Hip Joint; $I_D$ Ischium; T CG of Thigh). Pressure mat data was recorded as was the position of the pressure mat, strain strip end points and relevant anatomical landmarks, all measured using a three-dimensional coordinate measuring machine (CMM) (not shown). In addition, the CMM was used to measure the portion of the body cross section above the seat 12 so that, by combining the data from the strain strip 150 with the CMM measurements, a complete cross-sectional section 100 was generated. For example, the S cross-sectional section 104,104',104'' for the thorax was measured using the strain strip 150 to determine the shape of the portion of the occupant in contact with the seat back 20. The front of the occupant was measured with the CMM. The two shapes were combined into one continuous curve.

Using this measurement method, the shape of the A, S, L and B cross-sectional sections 110,110',110'', 104,104',104'', 108,108',108'', and 102, 102', 102'', respectively, were measured with occupants in the ERECT, NEUTRAL, and SLUMPED postures. The S and L shapes were compared for each occupant for the three postures, ERECT, NEUTRAL, and SLUMPED. Again, differences were small compared to the differences between occupants. The cross sectional shape of an individual human occupant changes little due to changes in posture while the differences between individual occupants can be large. It should be appreciated that the focus was to determine an average neutral shape rather than concentrate on the small changes in cross sectional shape due to posture changes.

The cross-sectional plane for the ischial/buttock region was defined relative to the ASIS points and the ischial tuberosities. The plane contains the left and right ASIS, hip joints and the ischial tuberosities. The location of the ischial points were measured. In general, the ischial tuberosities were located using the pressure mat to identify the areas of peak pressure and locating the pressure mat relative to the ASIS points to provide an estimate of the location of the ischial tuberosities relative to the ASIS in the horizontal plane. It should be appreciated that the vertical location of the ischial points is determined knowing the distance from the ASIS to the ischial points.

The cross sectional plane of the thigh was defined relative to the hip point to knee joint line at the center of gravity (CG) of the thigh. The knee joint center was defined as the mid-point between the medial and lateral epicondyles of the femur. Thigh splay angle was defined as the angle formed by the knee-hip line from the mid-sagittal plane.

Torso Cross-Sectional Measurements

The cross-sectional sections 100 for the torso sections 22 were made at four (4) levels for the torso region at the spinal levels of T4, T8, L4, and S1. The torso cross-sections were measured with and without back support to determine the effect back support has on the shape of the back tissue. It should be appreciated that raw data from representative occupants illustrates specific points relevant to decisions on data collection methods.

Figure 26:
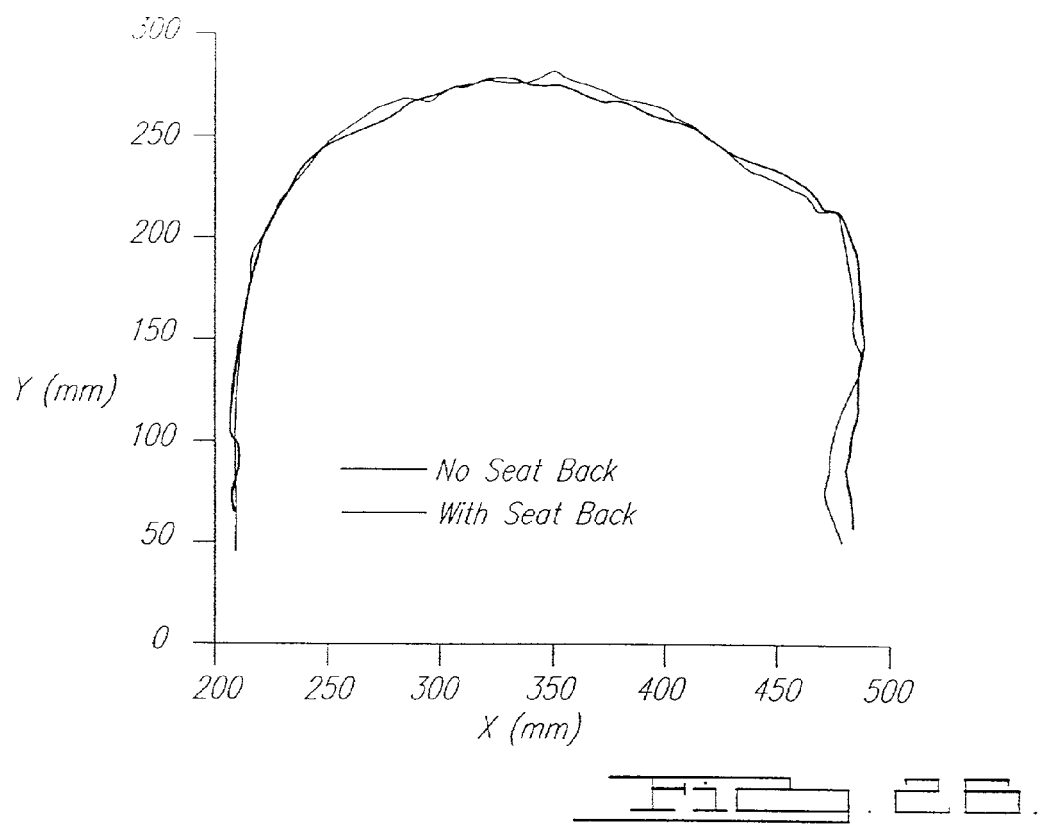
FIG. 26 is a graph of measurement of an occupant T8 cross-sectional section with and without seat back.

Raw data for chest and lumbar cross sections with and without back support are illustrated in FIG. 26. In FIG. 26, measurement of an occupant T8 cross section with and without seat back was performed. For the torso, back support has no measurable effect on the shape of the back tissue. Thus, torso cross sections were measured without back support.

Figure 27:
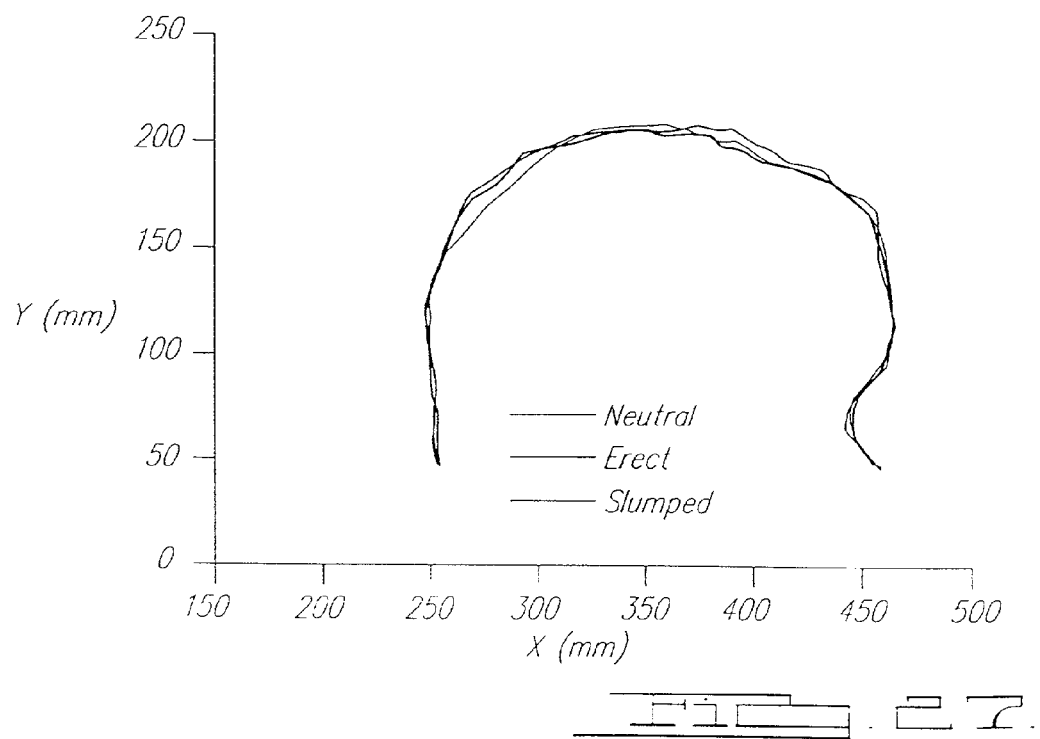
FIG. 27 is a graph of an effect of postural changes on the occupant T8 cross-sectional section measured in the NEUTRAL, ERECT, and SLUMPED posture.

The effect of posture (i.e., ERECT, NEUTRAL, SLUMPED) on the shape of back, buttock, and thigh shapes was investigated on eleven (11) occupants. FIG. 27 illustrates the effect of postural changes on the T8 cross section with the occupant measured in the NEUTRAL, ERECT, and SLUMPED posture. There was no measurable change in cross sectional back tissue shape due to posture. It should be appreciated that the differences in cross sectional shape are small for changes in posture compared to the large change in shape for changes in body size.

Figure 28:
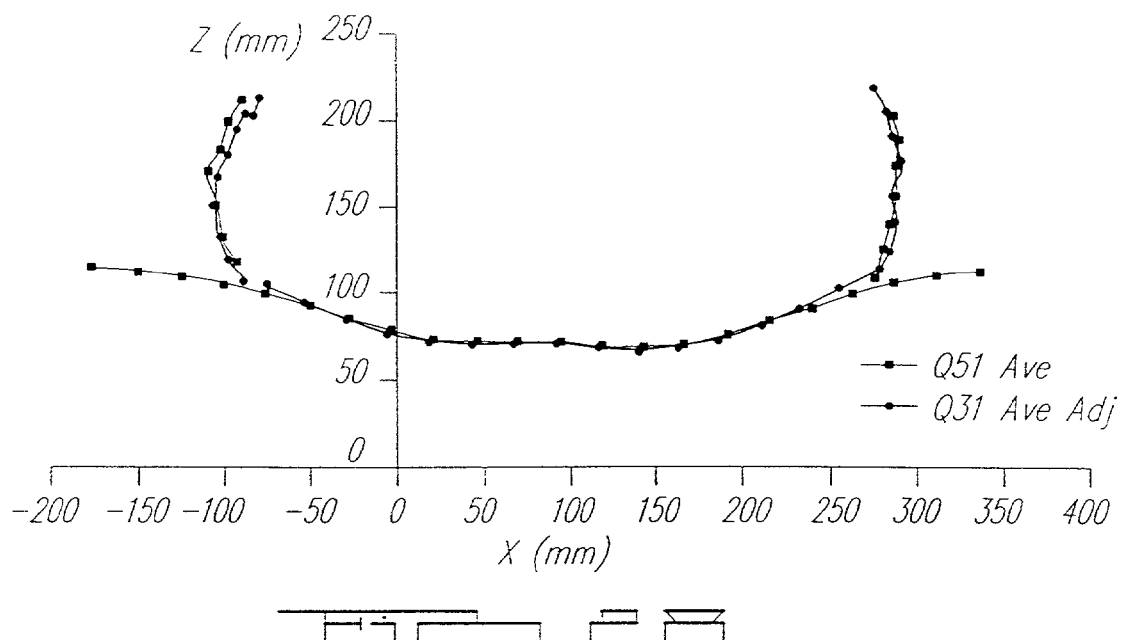
FIG. 28 is a graph of shape of an occupant buttock with two foam types.

Referring to FIG. 28, the shape of buttock with two foam types is illustrated. The shape of the buttock is similar for both foam types. Q31 (soft) foam had deeper penetration, thus the shape is adjusted by a fixed z value to match the position of the shape of the buttocks in Q51 foam. It should be appreciated that the shapes are the average of three measurements from a single occupant.

Figure 29:
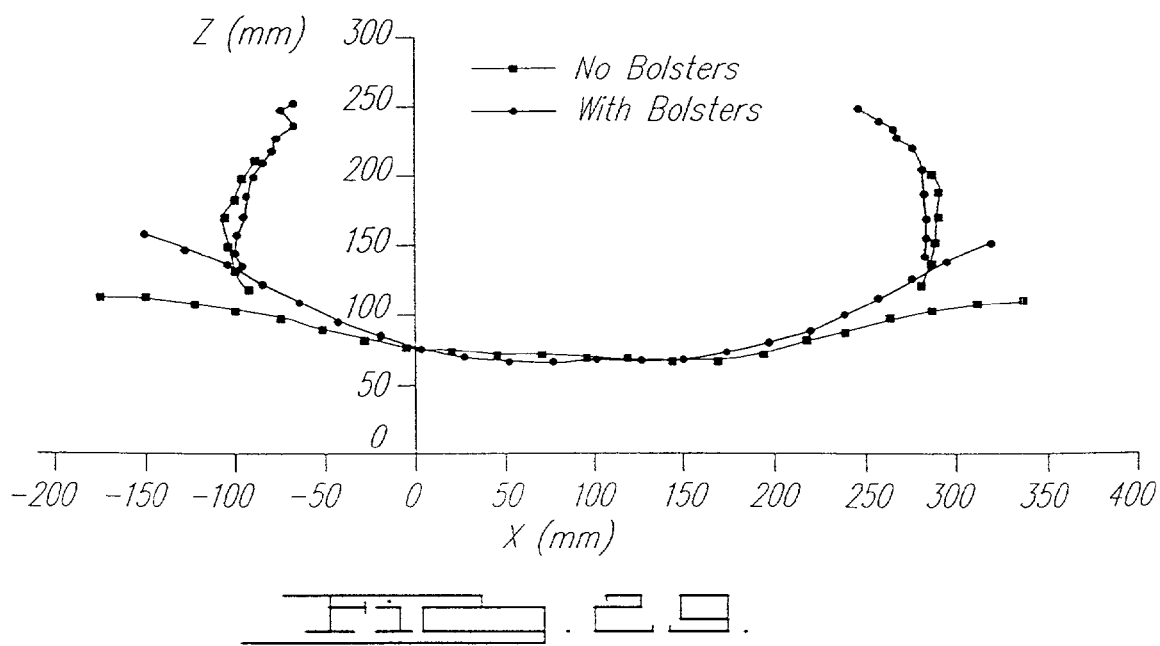
FIG. 29 is a graph of change in occupant buttock cross-sectional shape with and without bolsters.

Referring to FIG. 29, change in buttock cross sectional shape with and without bolsters is illustrated. The graph illustrates an average of three measurements of one occupant with and without bolsters. It should be appreciated that there is a significant change in the shape of the tissue in the bolster region.

Cross Sectional Definitions

Figure 20:
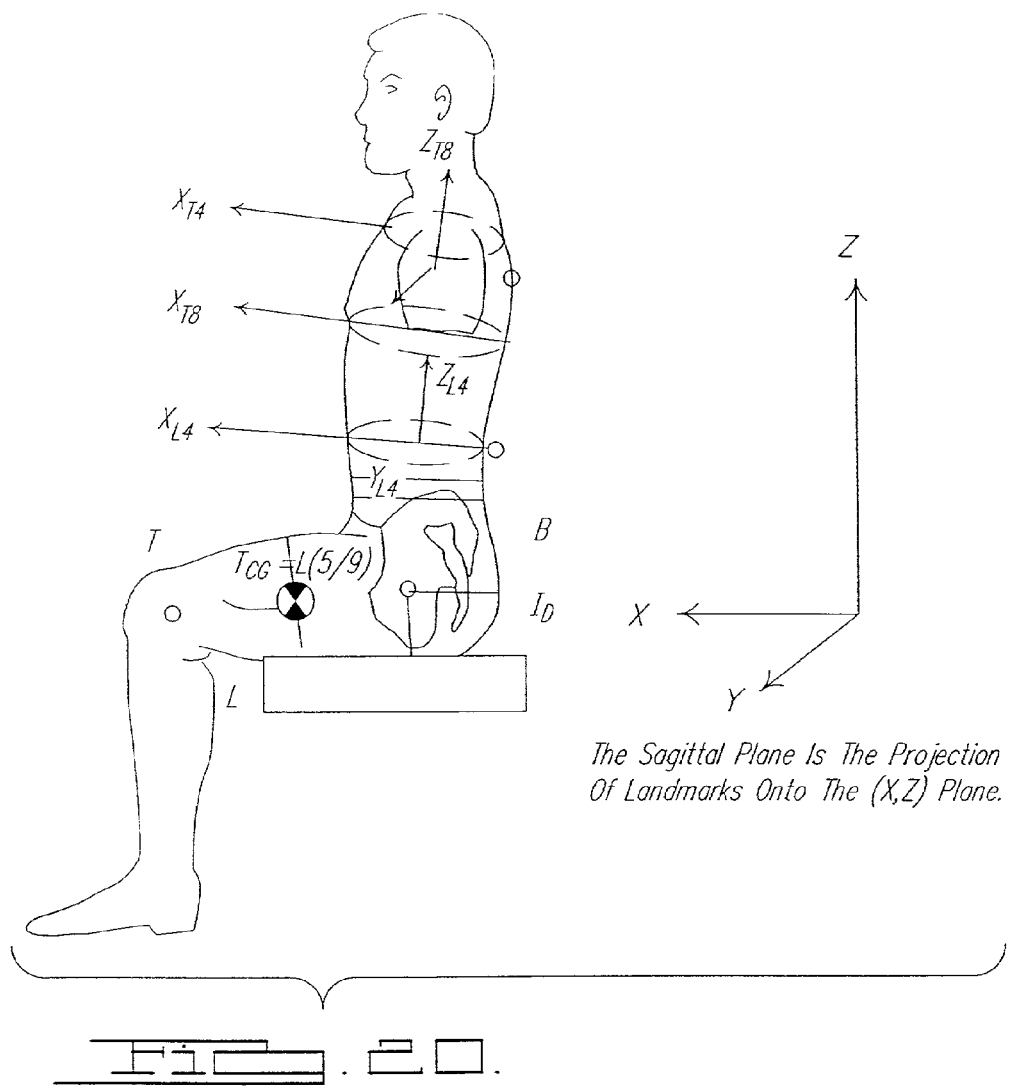
FIG. 20 is an elevational view of orientation of the "T" and "$I_D$" cross-sectional sections at T8 and L3 of a human body occupant.

The A, S, L and B cross sectional sections 100 were measured at anatomical landmarks representing T4, T8, L4, and hip joint and are oriented relative to the hip joint to shoulder joint axes and their respective anatomical landmarks. On the design template 10, the torso angle is determined by the relationship of the hip-shoulder line to vertical. Thus, it was assumed that the cross-section of interest must be load bearing as well as representative of several vertebrae above and below that region. The cross-sections 100 were defined relative to a coordinate system having an origin at the respective bony landmark as illustrated for T8 in FIG. 20 as follows:

the z axis is parallel to the sagittal plane projection of the hip-shoulder line;

the x axis is perpendicular to the hip shoulder line in the forward direction and is lying on the mid-sagittal plane; and the y axis is defined as the cross-product of the z and x axes to form a right-handed coordinate system. The cross-sections at T4, T8, L4, and hip joint are defined such that each cross section is perpendicular to the hip-shoulder line collapsed to the sagittal plane.

Thigh and buttock shape were measured with the seat 12 with foam on the seat pan 18 and seat back 20. The occupant was positioned with the feet on a footrest, hands on a steering wheel, spine in the NEUTRAL posture and knee angle at approximately 135°. The strain strip 150 was positioned at the appropriate location for the measurement (under $I_D$ or T cross-section as appropriate) with the strain strip 150 above the large pressure mat. The pressure mat data was recorded, as was the position of the pressure mat and the strain strip 150. The shape of the thighs or pelvis for the portion of the body not in contact with the seat foam was measured using the CMM.

$I_D$ Cross-Section

Figure 21:
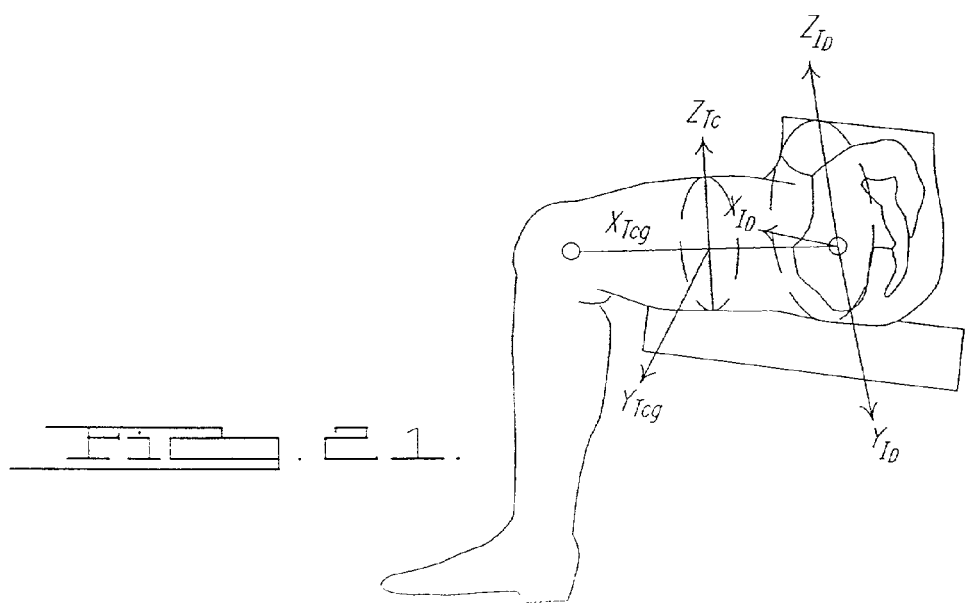
FIG. 21 is an elevational view of orientation of the thigh and "$I_D$" cross-sectional sections of a human body occupant.

The cross-sectional plane for the ischial/buttock region was defined relative to the ASIS points and the hip joints. The plane contains the left and right ASIS and the ischial tuberosities as illustrated in FIG. 21. Thus, the widest section of the hips is contained and the ASIS points are available for seatbelt design considerations. In addition, the hip joints (H-point) 116 are included since the hip joints 116 lie along the sagittal projection of the ASIS-$I_D$ line.

1. $ZI_D$ is perpendicular to the line connecting the left and right ASIS.

2. $YI_D$ is defined by the left and right ASIS points.

3. $XI_D$ is defined as the cross-product of $ZI_D$ and $YI_D$, to form a right handed coordinate system.

Thigh Cross-Section

The cross sectional plane of the thigh was defined relative to the H-point to knee joint line at 4/9 the distance from hip joint to knee joint. The knee joint center was defined as the mid-point between the medial and lateral epicondyles of the femur. The thigh cross section coordinate axes were defined so that:

1. $Z_{Teg}$ is parallel to the Z axis of the seat 12;

2. $X_{Teg}$ is perpendicular to $Z_{Teg}$, and is lying on the mid-sagittal plane; and 3. $Y_{Teg}$ is defined as the cross-product of $Z_{Teg}$ and $X_{Teg}$ to form a right-handed coordinate system.

Y'D

Figure 22:
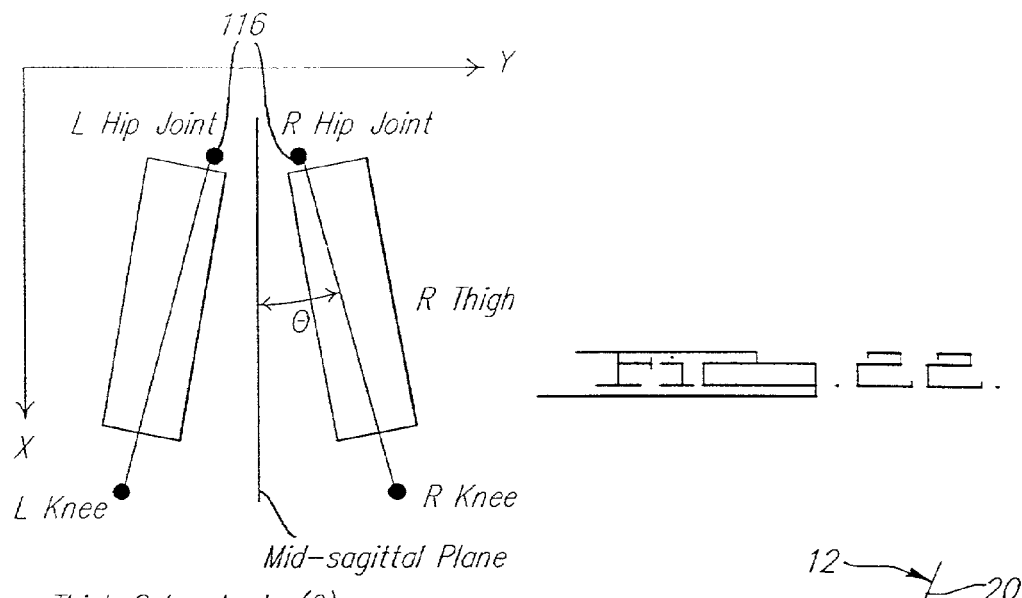
FIG. 22 is a diagrammatic plan view of thigh splay angle.

Thigh splay angle was defined as the angle formed by the knee-hip line from the midsagittal plane as illustrated in FIG. 22.

Bony Landmarks

For each cross-sectional section 100 of the design template 10, the relevant bony landmarks were measured and depicted on the cross-sectional section 100. The landmarks included in each cross-sectional section 100 are:

S and A cross-sectional sections 104 and 110 have the spinous process for that level represented by the vertebrae 122 and the inferior tip of the scapula represented by point SB 124;

L cross-sectional section 108 has the spinous process of the lower lumbar spine represented by the vertebrae 122;

B cross-sectional section 102 has the hip joint 116, sacrum, ASIS point A 118, and outline of the greater trochanter and femur head 114;

$I_D$ cross-sectional section 106 has the ASIS point A 118, hip joint 116, $I_D$ point 128, and the greater trochanters;

T cross-sectional section 112 has no bone landmarks and only shows the deformed shape of the tissue of the thigh.

The outlines of relevant bones are included on the cross-sectional sections 100, including the outlines of the vertebra 122 and the pelvis 126 and femur 114. It should be appreciated that these outlines accurately represent the shape of the bone at the various cross-sectional sections 100 for a given body size. The methods for obtaining these shapes are described below.

As to the pelvis 126, the pelvic shapes are based on data from the FAA pelvic study. The average medium male pelvis shape was obtained from averaging landmarks from pelvises measured by Reynolds et al in 1982 and the average medium female pelvis was obtained from averaging landmarks from pelvises measured by Reynolds et al in 1982. The large male pelvis was scaled up from the medium male and the small female pelvis was scaled down from the medium female pelvis. It should be appreciated that the outline represents a view of the pelvis through a cross section of a plane that passes through the right and left ASIS and the right and left ischial tuberosities.

As to the femur head 114, the cross section through the femur was set by measuring a femur in the same position as the femur position for the average or medium male occupant. The section through the femur was the same as the section through the pelvis. Thus, the outline of the femur head 114 and the greater trochanter are representative of the automotive driving posture. In addition, the outlines are accurate representations of the bone relative to the deformed soft tissue. The femur shape was scaled using the diameter of the femur head 114 as the scale factor, and using the FAA skeletal data as a description of the medium male and medium female femur shape. An examination of data from the FAA skeletal data revealed that the male/female differences were not in the shape of the femur head/neck/trochanter region, but in the angle between the neck and the shaft of the femur. The head size and neck length of the single femur measured were representative of the data from the FAA skeletal data except for scale. It should be appreciated that the femur shape was scaled to represent the medium male, large male, and small female.

As to the vertebrae 122, representative vertebral cross sections were obtained from a cross sectional anatomy reference source. The cross sections were scaled to average vertebral measurements. The average was used in the medium male cross section and scaled for the large male and small female based on the ratio of the breadth of the cross section (Y-axis maximum width) to the breadth of the vertebra 122.

As to the scapula, the tip of the scapula was measured on each occupant and the average for each body size (large male, medium male and small female) included on the corresponding S cross-sectional section 104,104',104" by a hole in the cross-sectional section 104,104',104", offset from the body surface by 5 mm.

Averaging Cross Sectional Shapes

Data for each cross-sectional section 100 was rotated relative to anatomical references so that comparable coordinates were used for all occupants. Due to variations in body size and because measurements were made by hand, the number of measurement points for each cross-sectional section 100 was different for each occupant. Thus, there was a need to reduce the bias of averaging excess data from one occupant with sparse data from another occupant. The number of data points for each cross-sectional section 100 was reduced by first averaging the data for each occupant in a radial manner in approximately five degree (5°) increments so that each cross-sectional section 100 for every occupant had the same number of data points. It should be appreciated that missing data was linearly interpolated.

Scaling Cross-Sectional Sections

Scale factors were developed to dimensions that scale the shapes described above to dimensions that accurately represent the large male ($95^{th}$ percentile), medium male ($50^{th}$ percentile) and small female ($5^{th}$ percentile) for the appropriate cross-sectional section 100. For defining cross-sectional dimensions, the only variable of statistical importance is weight, with height being independent of the cross-sectional shape. The regression equations for variables as a function of weight and the corresponding correlation coefficient ($R^2$) are given in Table 6. Scale the average shapes to match the regression dimensions for each cross-sectional section 100. This was done in three steps:

1. Regression equations from occupant data for specific cross sections were developed with weight as the only variable;
2. The regression equations were used to predict the large male, medium male and small female dimensions for specific cross-sectional sections 100 by using the $95^{th}$, $50^{th}$ and $5^{th}$ weights from the 1988 US Army Anthropometric Survey; and
3. Scale the average shapes to match the regression dimensions for each cross section.

TABLE 6

Regression equations by occupant weight.

| | Males Regression Eqn x = weight in kg {$R^2$} | Females Regression Eqn x = weight in kg {$R^2$} |
|---|---|---|
| Height | 1.47x + 1676 {.076} | 5.24x + 1284 {.364} |
| T8 Breadth | 1.90x + 210.1 {.555} | 1.93x + 192.8 {.462} |
| L4 Breadth | 2.25x + 152.4 {.589} | 2.31x + 165.6 {.430} |
| Buttock Breadth (at ischium) | 1.82x + 252.3 252.3 {.603} | 1.96x + 277.7 {.242} 277.7 {.242} |
| Thigh Breadth | 1.08x + 115.2 {.495} | 1.04x + 135.8 {.315} |

Height, weight, and specific anthropometric comparisons were made for the design template and Army anthropometric occupants. The design template small female (1582.7 mm and 57.08 kg) and medium male occupants (1783.7 mm and 77.8 kg) are slightly taller and heavier than the corresponding Army $5^{th}$, $50^{th}$ while the design template large males (1819.2 mm and 92.11 kg) were slightly shorter and lighter than the Army $95^{th}$. The breadths at T8, L4, and $I_D$ were compared to the chest, waist, and hip breadths of the Army data. It should be appreciated that the methods of measurement and the location of the measurements were slightly different between the two studies, and comparison of the two is not appropriate, thus no percentile values are given for these measurements.

The above regression equations were used to scale the cross-sectional sections 100. For example, to scale the S cross-sectional section 104", the large weight from the 1988 Army Anthropometric Survey was used in the T8 regression equation for the males. The S cross-sectional section 104" as illustrated in FIG. 19B was then scaled so that the breadth matched that estimated for a large male weight. It should be appreciated that weight was used to scale all cross-sectional sections 100.

An examination of the regression equations of the Army anthropometric data reveals that cross sectional dimensions of breadth have strong correlations with weight and no statistically significant relationship to height. It should be appreciated that, in terms of defining cross sectional dimensions, the only variable of statistical importance is weight, with height being independent of the cross sectional shape.

Pelvis and Femur Shapes

An average pelvis shape was determined for each gender by averaging the data in the FAA skeletal data as previously described. The average male and female pelvis 126 are illustrated in FIGS. 17A through 19F. The average femur head 114 for the appropriate cross-sectional section 100 is illustrated in FIGS. 17A, 17C, 18A, 18C, 19A, and 19C.

Final Shapes

The final shapes were developed in a CAD program (AutoCAD) to allow the development of full-scale cross-sectional sections 100. In addition to external shape, the bony landmarks and outline of appropriate skeletal structures were included in the final shapes. Further design was required to develop a means for estimating thigh splay for a given thigh cross-sectional section 112,112',112". For each cross-sectional size (small female, medium male and large male), a scale was developed that gives the thigh splay in millimeter (mm) units (distance apart, with the position of both thighs in contact being zero) as well as angle of leg splay. Leg splay is defined as the angle of a line from the mid point of the femur at the knee joint to the center of the hip joint (Hpoint) and the mid-sagittal plane. This angle is illustrated in FIGS. 17F, 18F, and 19F.

All of the cross-sectional sections 100 are illustrated in FIGS. 17A through 19F. The A, S, L, B, $I_D$, and T cross-sectional sections 110,110',110", 104,104',104", 108,108', 108", 102,102',102", 106, 106',106", and 112,112',112", respectively, are illustrated in FIGS. 17A through 19F.

Use of Cross-Sectional Sections in Seat Design

Figure 23:
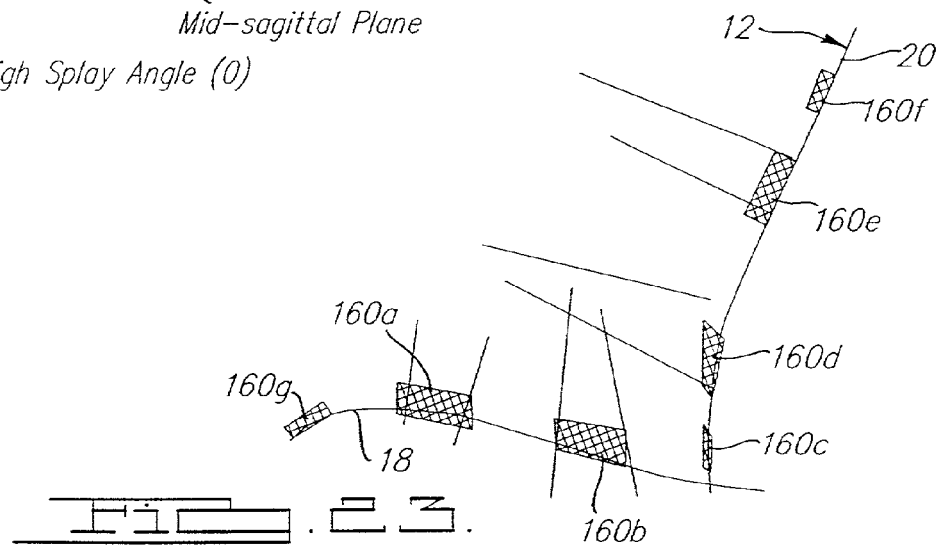
FIG. 23 is a diagrammatic elevational view of patches on a seat.

The combination of the cross-sectional sections 100 for a range of occupants produces a three-dimensional map of the human body occupant in contact with the seat 12. When the collection of human body models thus produced is combined for seat design, the population of seated occupants is represented for seat design. That is, when the cross-sectional sections 100 are combined, they form patches, generally indicated at 160, on the seat 12. For example, when the T cross-sectional section 112 for the small female is combined with the T cross-sectional section 112' for the medium male and the T cross-sectional section 112 for the large male having each being one of a group of an ERECT posture, a NEUTRAL posture and a SLUMPED posture, the thoracic region of the seat 12 that supports all of these occupants at "S" is defined. This region is referred to as seat patch 160e as illustrated in FIG. 23. The differences in the location of this patch 160e are based then upon the differences in size and load, since the similarity between the different occupants is based upon the similar functions of the same anatomical location in the environment. For example, every occupant sits upon the load-bearing region of the pelvis 126 in the ischium region at seat patch 160b. However, since each occupant sits in a slightly different location in the seat 12, the combination of the ischium cross-sectional sections 106,106',106' creates an ischial patch 160b on the seat 12 that must function similarly for each occupant.

A three dimensional shape of the torso, buttocks and thigh was generated by interpolating between cross-sectional sections 100 with a smooth continuous surface using the cross-sectional data and following the centerline curves as controls of the torso section 22 having an interface contour 23a and thigh section 44 having an interface contour 51a.

A seat design clearance surface is generated by an offset normal to the respective back interface contour 23a and thigh interface contour 51a as determined by seat stiffness requirements. For example, a seat with high stiffness (e.g. hard) may have a smaller offset than a seat with low stiffness (e.g. soft). The clearance surface is used to determine interference between any template and the seat structures that might contact the body when occupying the seat 12.

A smaller offset can be selected to generate the clearance surface for the template back compared to the offset used to generate the clearance surface for the buttocks and thigh.

The thigh and buttock clearance surface is used to define the required space between any occupant and rigid structure supporting the seat cushion 18; for example, the frame including an anti-submarining structure, track, or rigid components supporting the seat suspension. The offset between occupant in the seat 12 and structure in the seat 12 thereby produces a space in which the body can safely move as a result of any external force acting on the body without the body hitting any non-deformable surface under the deformable surface of the seat trim, foam and suspension.

The back clearance surface is used to define the clearance between any occupant and rigid structure supporting the seat back 20; for example, the seat back frame, the lumbar support mechanism when fully retracted and any non-deformable safety structure to prevent occupant motion. The offset between occupant in the seat 12 and structure in the seat 12 thereby produces a space in which the body can safely move as a result of any external force acting on the body without the body hitting any non-deformable surface behind the deformable surface of the seat trim, foam and suspension.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A design template for use with a seat, comprising:
   a torso section representing a torso of one of a large male, a medium male and a small female having one of an ERECT posture, a NEUTRAL posture and a SLUMPED posture and at least one anatomical landmark; and
   at least one cross-sectional section of the torso cooperating wit said torso section at the anatomical landmark, the at least one cross-sectional section representing a cross-section of the torso section and being generally at a right angle to the torso section and describing a body seat interface at the at least one anatomical landmark, the anatomical landmark being located on the body seat interface, the body seat interface described by the torso section and the at least one cross-sectional section being three dimensional.

2. A design template as set forth in claim 1 wherein said torso section has a portion of an outer contour conforming to a deformed shape of an interface contour between a seat and a seated occupant.

3. A design template as set forth in claim 2 wherein said torso section includes anatomical details located relative to each other and the interface contour is relative to said anatomical details.

4. A design template as set forth in claim 1 wherein said torso section includes indicia of skeletal landmarks for a shoulder joint and a hip joint and an axis connected therebetween.

5. A design template as set forth in claim 1 wherein said torso section includes a centerline projection of a pelvis with indicia representing an ischial tuberosity, anterior superior iliac spine, pubic symphysis and sacrum.

6. A design template as set forth in claim 1 wherein said torso section includes an angular scale for torso angle.

7. A design template as set forth in claim 1 wherein said torso section includes an angular scale for hip angle.

8. A design template as set forth in claim 1 wherein said torso section has an anterior shape that is anthropometrically and anatomically correct.

9. An occupant restraint system for a seat comprising:
a lap belt being anchored to vehicle structure to extend below an anterior superior iliac spin and above an anterior inferior iliac spine for a design template with a torso section representing a torso of one of a large male, a medium male, and a small female and having one of an ERECT posture, a NEUTRAL posture and a slumped posture; and
a shoulder belt being anchored to vehicle structure to extend between a first predetermined distance from a centerline of the seat to a should joint for the design template, said design template including at least one cross-sectional section representing a cross-section of the torso and cooperating with said torso section at an anatomical landmark, the at least one cross-sectional section being generally at a right angle to the torso section and describing a body seat interface at the at least one anatomical landmark, the anatomical landmark being located on the body seat interface, the body seat interface described by the torso section and the at least one cross-sectional section being three dimensional.

10. An occupant restraint system as set forth in claim 9 wherein said first predetermined distance is 190 mm for the small female, 246 mm for the medium male and 267 mm for the large male, and said second predetermined distance is 51 mm for the small female, 65 mm for the medium male and 71 mm for the large male.

11. A method of establishing occupant accommodation criteria in a vehicle package based on a predetermined class of vehicles comprising:
providing a design template having a torso section representing a torso of one of a large male, a medium male and a small female having one of an ERECT posture, a NEUTRAL posture and a SLUMPED posture and having a leg section and at least one cross-sectional section cooperating with said torso section at an anatomical landmark and describing a shape of a body seat interface, the at least one cross-sectional section representing a cross-section of the torso and being generally at a right angle to the torso section, the anatomical landmark being located on the body seat interface, the body seat interface described by the torso section and the at least one cross-sectional section being three-dimensional;
defining a planar region under an accelerator to provide a heel point for the leg section;
defining seat stiffness of a seat whether stiffness (hard), low stiffness (soft) or some stiffness therebetween;
positioning the design template in the vehicle such that the eye line of sight is within vision requirements of the vehicle environment; and
positioning the design template in the vehicle such tat the distance between the supplemental restraint system in the steering wheel to chest is as great as possible to provide a safe distance for each occupant driving the vehicle.

12. A method as set forth in claim 11 including the step of adjusting joint angles at an ankle, knee, and hip of the design template to lie within a predetermined range.

13. A method as set forth in claim 11 including the step of reclining the torso section a predetermined angle from vertical.

14. A method as set forth in claim 11 including the 25 step of defining the seat design position at the rearmost and downmost position of the seat in the vehicle package.

15. A method for designing a seat comprising: selecting at least one design template having a torso section representing a torso of one a large male, a medium male and a small female having one of an ERECT posture, a NEUTRAL posture and a SLUMPED posture and having a leg section and at least one cross-sectional section cooperating with said torso section at an anatomical landmark, the at least one cross-sectional section representing a cross-section of the torso and being generally at a right angle to the torso section and describing a body seat interface at the anatomical landmark, the anatomical landmark being located on the body seat interface, the body seat interface described by the torso section and the at least one cross-sectional section being three dimensional;
forming load supporting contours of the occupied seat for the at least one design template; and
forming unloaded patches of the unoccupied seat for the at least one design template.

16. A method as set forth in claim 15 including the step of defining an offset surface contour of the design template in the occupied seat and seat structure.

17. A method as set forth in claim 15 including the step of estimating a first point of a shoulder patch on a seat back at a T4 spinal landmark.

18. A method as set forth in claim 15 including the step of estimating a first point of the load supporting patch of a seat back at $S^O$ under occupant load.

19. A method as set forth in claim 18 including the step of estimating a second point at $S^O$ on the unloaded patch of the seat back.

20. A method as set forth in claim 15 including the step of estimating a first point of a load supporting patch of a seat back at $L^O$ under occupant load.

21. A method as set forth in claim 20 including the step of estimating a second point at LU on an unloaded patch of the seat back.

22. A method as set forth in claim 15 including the step of estimating a point on a bite line patch of a seat back at "B".

23. A method for as set forth in claim 15 including the step of estimating a first point of a load supporting patch of a seat cushion at $I_D^O$ under occupant load.

24. A method as set forth in claim 23 including the step of estimating a second point at $I_D^O$ on an unloaded patch of the seat cushion.

25. A method a set forth in claim 15 including the step of estimating a first point of a load supporting patch of a seat cushion at $T^O$ under occupant load.

26. A method as set forth in claim 25 including the step of estimating a second point at $T^U$ on an unloaded patch of the seat cushion.

27. A method as set forth in claim 26 including the step of optimally matching the unoccupied load support points for the other torso sections and postures of the design template to define the unoccupied seat patch.

28. A method as set forth in claim 27 including the step of constructing an unloaded point $S^U$ for each of the design templates.

29. A method as set forth in claim 27 including the step of constructing an unloaded point $L^U$ for each of the design templates.

30. A method as set forth in claim 27 including the step of constructing an unloaded point $I_D^U$ for each of the design templates.

31. A method as set forth in claim 27 including the step of constructing an unloaded point $T^U$ for each of the design templates.

32. A method as set forth in claim 15 including the step of defining an unoccupied seat region patch for a shoulder.

33. A method as set forth in claim 15 including the step of defining an unoccupied seat patch for a thorax region.

34. A method as set forth in claim 15 including the step of defining an unoccupied seat patch for a lumbar.

35. A method as set forth in claim 15 including the step of defining an unoccupied seat patch for a bite line.

36. A method as set forth in claim 15 including the step of defining an unoccupied seat patch for an ischium.

37. A method as set forth in claim 15 including the step of defining an area for a seat suspension in the seat.

38. A method as set forth in claim 15 including the step of defining an unoccupied scat patch for a thigh.

39. A method as set forth in claim 15 including the step of defining a waterfall region of an unoccupied seat.

40. A method of using a design template to design a vehicle seat comprising:
providing at least one design template having a torso section representing a torso of one of a large male, a medium male and a small female having one an ERECT posture, a NEUTRAL posture and a SLUMPED posture and at least one cross-sectional section cooperating with said torso section at an anatomical landmark, the anatomical landmark being located on the body seat interface, the at least one cross-sectional section representing a cross-section of the torso being generally at a right angle to the torso section to provide a three-dimensional design template,;
establishing occupant accommodation criteria based on positioning the at least one design template in a predetermined class of vehicles to define occupied seat position to accommodate the at least one design template on a seat having a seat cushion and a seat back in a vehicle representing the vehicle package criteria; and
defining at least one from a group comprising unloaded patches on the seat at A, $S^U$, $L^U$, B, $I_D^U$ and $T^U$;
defining at least one from a group comprising a seat back height, seat cushion length, head restraint position, shoulder patch, thorax patch, lumbar patch, bite line patch, ischial patch, thigh patch, seat cushion bolster, and seat suspension for the seat relative to the design template.

41. A method as set forth in claim 40 wherein said step of defining a seat back height for the seat relative to the design template comprises terminating a seat back height relative to the design template at or above a top of the shoulder patch.

42. A method as set forth in claim 40 wherein said step of defining a seat back height for the seat relative to the design template comprises locating a top cross member of the seat back frame relative to the design template at a position equal to or higher than the thorax patch in the unoccupied seat.

43. A method as set forth in claim 40 wherein said step of defining a head restraint position for the seal relative to the design template comprises determining a position of a center of mass of a head for the torso section relative to the design template, locating a back of a head for the torso section of the large male relative to the determined position of the center of mass of the head, and defining a lowest maximum height of the head restraint relative to the design template at the back of the head forte torso section of the large percentile male having the ERECT posture.

44. A method as set forth in claim 40 wherein said step of defining a shoulder patch fir the seat relative to the design template comprises defining an area for the shoulder patch relative to the design template between a T4 contact zone for the torso section of the large male having the ERECT posture and the T4 contact zone for the torso section of the medium male having the SLUMPED posture.

45. A method as set forth in claim 40 wherein said step of defining a thorax patch for the seat relative to the design template comprises defining an area for the thorax patch relative to the design template between a thorax seat patch for the torso section of the large male having the ERECT posture and the thorax seat patch for the torso section of the small female having the SLUMPED posture.

46. A method as set forth in claim 40 wherein said step of defining a lumbar patch for the seat relative to the design template comprises defining an area for the lumbar patch relative to the design template between a lumbar seat patch for the torso section of the large male having the ERECT posture and the lumbar seat patch for the torso section of the small female having the SLUMPED posture.

47. A method as set forth in claim 40 wherein said step of defining a lumbar patch for the seat relative to the design template comprises locating a two-way, horizontal displacement adjustable lumbar support for the seat relative to the design template midway between and the highest and lowest locations of L4 for the torso sections of the design template.

48. A method as set forth in claim 40 wherein said step of defining a lumbar patch for the seat relative to the design template comprising locating a minimal vertical displacement of an adjustable lumbar support for the seat relative to the design template representing the highest and lowest locations of L4 for the torso sections of the design template.

49. A method as set forth in claim 40 wherein said step of defining a seat suspension for the seat relative to the design template comprises defining an area for the seat suspension relative to the design template between a furthest forward and rearward ischial load points for the torso section of the large male having the SLUMPED posture and for the torso section of the small female having the ERECT posture.

50. A method as set forth in claim 40 wherein said step of defining a seat cushion length for the seat relative to the design template comprises terminating a length of the seat cushion relative to the design template from ID on the torso section of the small female.

51. A seat comprising:
a seat cushion;
a seat back associated with said seat cushion; and
at least one from a group comprising a seat back height, seat cushion length, head restraint position, shoulder patch, thorax patch, lumbar patch, bite line patch, ischial patch, thigh patch, and seat suspension being defined for said seat cushion and said seat back relative to a design template having a torso section representing a torso of one of a large male, a medium male and a small female having one of an ERECT posture, a NEUTRAL posture and a SLUMPED posture and at least one cross-sectional section cooperating with said torso section at an anatomical landmark, the at least one cross-sectional section representing a cross-section of the torso and being generally at a right angle to the torso section and describing a body seat interface at the anatomical landmark, the anatomical landmark being located on the body seat interface, the body seat interface described by the torso section and the at least one cross-sectional section being three-dimensional.

52. A seat as set forth in claim 51 wherein said seat back height of said seat back terminates at or above a top of the shoulder patch on the unloaded seat surface of the seat.

53. A seat as set forth in claim 51 wherein said seat back includes a top cross member at a position equal to or higher than the thorax patch in the unoccupied seat.

54. A seat as set forth in claim 51 wherein said head restraint position is located relative to a position of a back of a head for the torso section.

55. A seat as set forth in claim 51 wherein said lumbar patch is located between the highest and lowest locations of L4 for the torso sections of the design template.

56. A seat as set forth in claim 55 wherein said lumbar patch is located for minimal vertical displacement to be between on the highest and lowest locations of L4 on the lumbar patch of torso sections of the design template.

57. A seat as set forth in claim 51 wherein said seat cushion length terminates at a back of a calf of the torso section for the small female sitting in a position on the seat that accommodates her driving position.

58. A seat as set forth in claim 51 wherein said seat suspension is defined in an area under the ischial patch for the torso section of the large male having the SLUMPED posture and for the torso section of the small female having the ERECT posture.

59. A seat as set forth in claim 51 including a seat anti-submarining restraint system defined in an area between a furthest forward ischial load zone for the torso section of the high clearance offset for the design template and the vertical barrier at the nose of the seat cushion to horizontal motion of the ischium for the design template.

60. A design template for use with a seat, comprising:
a torso section representing a torso and having at least one anatomical landmark; and
at least one cross-sectional section cooperating with said torso section at the anatomical landmark, the at least one cross-sectional section being generally at a right angle to the torso section and describing a body seat interface at the at least one skeletal landmark, the anatomical landmark being located on the body seat interface, the body seat interface described by the torso section and the at least one cross-sectional section being three dimensional.

61. An occupant restraint system for a seat, comprising:
a lap belt being anchored to vehicle structure to extend below an anterior superior iliac spin and above an anterior inferior iliac spine for a design template with a torso section representing a torso and having at least one anatomical landmark; and
a shoulder belt being anchored to vehicle structure to extend between a first predetermined distance from a centerline of the seat to a should joint for the design template, said design template including at least one cross-sectional section cooperating with said torso section at an anatomical landmark and describing a body seat interface at the at least one anatomical landmark, the at least one cross-sectional section being generally at a right angle to the torso section, the anatomical landmark being located on the body scat interface, the body seat interface described by the torso section and the at least one cross-sectional section being three dimensional.

62. A method of establishing occupant accommodation criteria in a vehicle package based on a predetermined class of vehicles comprising:
providing a design template having a torso section representing a torso, a leg section and at least one cross-sectional section of the torso, the torso section having at least one anatomical landmark, the at least one cross-sectional section generally being at a right angle to the torso section and cooperating wit said torso section at die anatomical landmark to provide a three-dimensional body seat interface, the anatomical landmark being located on the body seat interface;
defining a planar region under an accelerator to provide a heel point for the leg section;
defining seat stiffness of a seat;
positioning the design template in the vehicle such that the eye line of sight is within vision requirements of the vehicle environment; and
positioning the design template in the vehicle such that the distance between the supplemental restraint system in the steering wheel to chest is as great as possible to provide a safe distance for each occupant driving the vehicle.

63. A method for designing a seat comprising:
providing at least one design template having a torso section representing a torso, a leg section, at least one cross-sectional section of the torso, the torso section having at least one anatomical landmark, the at least one cross-sectional section generally being at a right angle to the torso section and cooperating with said torso section at the anatomical landmark to provide a three-dimensional body seat interface, the anatomical landmark being located on the body seat interface;
forming load supporting contours of the occupied seat for the at least one design template; and
forming unloaded patches of the unoccupied seat for the at least one design template.

64. A method of using a design template to design a vehicle seat comprising:
providing at least one design template having a torso section representing a torso and at least one cross-sectional section of the torso, the torso section having at least one anatomical landmark, the at least one cross-sectional section generally being at a right angle to the torso section and cooperating wit said torso section at the anatomical landmark to provide a three-dimensional body seat interface, the anatomical landmark being located on the body seat interface;
establishing occupant accommodation criteria based on positioning the at least one design template in a predetermined class of vehicles to define occupied seat position to accommodate each design template on a seat having a seat cushion and a seat back in a vehicle representing the vehicle package criteria; and
defining at least one unloaded patch on the seat at a predetermined position;
defining at least one of a seat back height, seat cushion length, head restraint position, shoulder patch, thorax patch, lumbar patch, bite line patch, ischial patch, thigh patch, seat cushion bolster, and seat suspension for the seat relative to the design template.

65. A seat comprising:
a seat cushion;
a seat back associated with said seat cushion; and
at least one of a seat back height, seat cushion length, head restraint position, shoulder patch, thorax patch, lumbar patch, bite line patch, ischial patch, thigh patch, and seat suspension being defined for said seat cushion and said seat back relative to a design template having a torso section representing a torso and at least one cross-sectional section of the torso, the torso section having at least one anatomical landmark, the at least one cross-sectional section generally being at a right angle to the torso section and cooperating with said torso section at the anatomical landmark to provide a three-dimensional body seat interface, the anatomical landmark being located on the body seat interface.

* * * * *

UNITED STATES PATENT AND TRADEMARK OFFICE
CERTIFICATE OF CORRECTION

| | | |
|---|---|---|
| PATENT NO. | : 7,047,831 B2 | Page 1 of 1 |
| APPLICATION NO. | : 10/035990 | |
| DATED | : May 23, 2006 | |
| INVENTOR(S) | : Herbert M. Reynolds and Raymond R. Brodeur | |

It is certified that error appears in the above-identified patent and that said Letters Patent is hereby corrected as shown below:

Column 32, line 41, after "cooperating" delete [wit] and insert therein --with--.

Column 33, line 17, after "to a" delete [should] and insert therein --shoulder--.

Column 33, line 60, after "such" delete [tat] and insert therein --that--.

Column 36, line 1, after "head" delete [forte] and insert therein --for the--.

Column 36, line 27, after "displacement" insert therein --,--.

Column 37, line 57, after "to a" delete [should] and insert therein --shoulder--.

Column 38, line 9, after "cooperating" delete [wit] and insert therein --with--.

Column 38, line 10, after "at" delete [die] and insert therein --the--.

Column 38, line 45, after "cooperating" delete [wit] and insert therein --with--.

Signed and Sealed this

Twenty-second Day of August, 2006

JON W. DUDAS
*Director of the United States Patent and Trademark Office*